(12) United States Patent
Dalal et al.

(10) Patent No.: US 7,159,093 B2
(45) Date of Patent: Jan. 2, 2007

(54) DEVELOPMENT OF A DETAILED LOGICAL VOLUME CONFIGURATION FROM HIGH-LEVEL USER REQUIREMENTS

(75) Inventors: Chirag Deepak Dalal, Mumbai (IN); Vaijayanti Rakshit Bharadwaj, Pune (IN); Pradip Madhukar Kulkarni, Pune (IN); Ronald S. Karr, Palo Alto, CA (US); John A. Colgrove, Los Altos, CA (US)

(73) Assignee: Veritas Operating Corporation, Mountain View, CA (US)

( * ) Notice: Subject to any disclaimer, the term of this patent is extended or adjusted under 35 U.S.C. 154(b) by 295 days.

(21) Appl. No.: 10/327,380

(22) Filed: Dec. 20, 2002

(65) Prior Publication Data

US 2004/0123062 A1    Jun. 24, 2004

(51) Int. Cl.
*G06F 12/00*      (2006.01)
(52) U.S. Cl. ..................... 711/170; 711/114
(58) Field of Classification Search ............... 711/114, 711/170; 709/220
See application file for complete search history.

(56) References Cited

U.S. PATENT DOCUMENTS

| | | | |
|---|---|---|---|
| 5,440,737 A | 8/1995 | Uchinuma | 395/600 |
| 5,897,661 A | 4/1999 | Baranovsky et al. | 711/170 |
| 6,058,489 A | 5/2000 | Schultz et al. | 714/7 |
| 6,078,990 A | 6/2000 | Frazier | 711/114 |
| 6,457,139 B1 | 9/2002 | D'Errico et al. | 714/5 |
| 6,519,679 B1 | 2/2003 | Devireddy et al. | 711/114 |
| 6,834,299 B1* | 12/2004 | Hamilton et al. | 709/220 |
| 6,904,599 B1 | 6/2005 | Cabrera et al. | 719/328 |
| 2002/0087780 A1 | 7/2002 | Selkirk | 711/6 |
| 2002/0133539 A1 | 9/2002 | Monday | 709/203 |
| 2003/0005119 A1* | 1/2003 | Mercier et al. | 709/225 |
| 2003/0046270 A1 | 3/2003 | Leung et al. | 707/1 |
| 2003/0093619 A1 | 5/2003 | Sugino et al. | 711/114 |
| 2003/0200109 A1* | 10/2003 | Honda et al. | 705/1 |
| 2003/0229698 A1 | 12/2003 | Furuhashi et al. | 709/226 |
| 2003/0233518 A1 | 12/2003 | Yamagami et al. | 711/114 |

OTHER PUBLICATIONS

*VERITAS Volume Manager 3.5: User's Guide—VERITAS Enterprise Administrator*, VERITAS Software Corporation, Jul. 2002, pp. i-118, http://www.filibeto.org/sun/lib/nonsun/veritas/vxvm/3.5/248612.pdf.

Alvarez, Guillermo A., et al., *MINERVA: An Automated Resource Provisioning Tool for Large-Scale Storage Systems*, Hewlett-Packard Laboratories, ACM Transactions on Computer Systems, vol. 19, No. 4, Nov. 2001, pp. 483-518.

Tanenbaum, Andrew S., *Hardware, Software, and Multilevel Machines*, Structured Computer Organization, Second Edition, 1984 Prentice-Hall, Inc. pp. 10-12.

*Computer Dictionary*, Third Edition, 1997 Microsoft Press, p. 176 (definition of *engine*).

*VERITAS Volume Manager 3.1: Administrator's Guide*, VERITAS Software Corporation, Aug. 2000, pp. 1-266.

* cited by examiner

*Primary Examiner*—Mano Padmanabhan
*Assistant Examiner*—Jasmine Song
(74) *Attorney, Agent, or Firm*—Campbell Stephenson Ascolese LLP

(57) ABSTRACT

A method, system, language, and computer program product to enable a user to provide a high-level specification of storage requirements without having detailed knowledge of the underlying vendor-specific APIs and command line utilities for each possible storage device used to meet the storage requirements. The user does not specify how to implement the storage requirements. The system implements the high-level specification in hardware and/or software without further direction from the user.

28 Claims, 29 Drawing Sheets

RAID-3

RAID-5

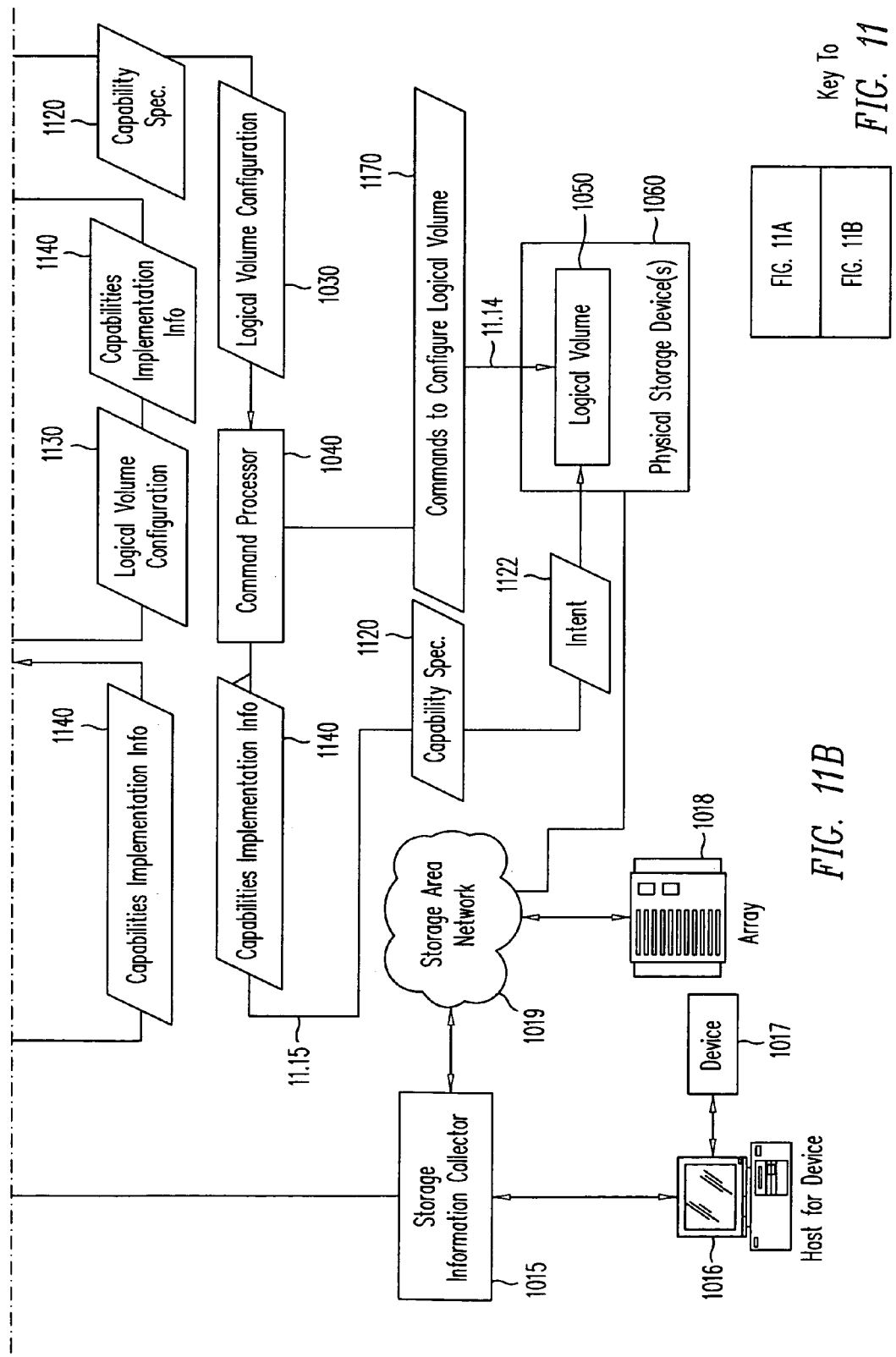

FIG. 16

DEVELOPMENT OF A DETAILED LOGICAL VOLUME CONFIGURATION FROM HIGH-LEVEL USER REQUIREMENTS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

CROSS REFERENCE TO RELATED APPLICATION

This application relates to application Ser. No. 10/324,858, filed on same day herewith, entitled "Preservation Of Intent Of A Volume Creator With A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety.

This application relates to application Ser. No. 10/325,418, filed on same day herewith, entitled "Adaptive Implementation Of Requested Capabilities For A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety.

This application relates to application Ser. No. 10/327,558, filed on same day herewith, entitled "Language For Expressing Storage Allocation Requirements" and naming Chirag Deepak Dalal, Vaijayanti Rakshit Bharadwaj, Pradip Madhukar Kulkarni, and Ronald S. Karr as inventors, the application being incorporated herein by reference in its entirety.

This application relates to application Ser. No. 10/327,535, filed on same day herewith, entitled "Intermediate Descriptions of Intent for Storage Allocation" and naming Chirag Deepak Dalal, Vaijayanti Rakshit Bharadwaj, Pradip Madhukar Kulkarni, Ronald S. Karr, and John A. Colgrove as inventors, the application being incorporated herein by reference in its entirety.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products produced by many different vendors. Each product typically is incompatible with the products of other vendors.

Historically, in storage environments, physical interfaces from host computer systems to storage consisted of parallel Small Computer Systems Interface (SCSI) channels supporting a small number of SCSI devices. Whether a host could access a particular storage device depended upon whether a physical connection from the host to the SCSI device existed. Allocating storage for a particular application program was relatively simple.

Today, storage area networks (SANs) including hundreds of storage devices can be used to provide storage for hosts. SAN is a term that has been adopted by the storage industry to refer to a network of multiple servers and connected storage devices. A SAN can be supported by an underlying fibre channel network using fibre channel protocol and fibre channel switches making up a SAN fabric. Alternatively, a SAN can be supported by other types of networks and protocols, such as an Internet Protocol (IP) network using Internet SCSI (iSCSI) protocol. A fibre channel network is used as an example herein, although one of skill in the art will recognize that a storage area network can be implemented using other underlying networks and protocols.

Fibre channel is the name used to refer to the assembly of physical interconnect hardware and the fibre channel protocol. The basic connection to a fibre channel device is made by two serial cables, one carrying in-bound data and the other carrying out-bound data. Despite the name, fibre channel can run over fiber optic or twin-axial copper cable. Fibre channel includes a communications protocol that was designed to accommodate both network-related messaging (such as Internet Protocol (IP) traffic) and device-channel messaging (such as SCSI). True fibre-channel storage devices on a SAN are compatible with fibre channel protocol. Other devices on a SAN use SCSI protocol when communicating with a SCSI-to-fibre bridge.

Fibre channel technology offers a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices. Performing a seemingly simple allocation of storage for an application program becomes much more complex when multiple vendors and protocols are involved.

Different types of interconnect entities allow fibre channel networks to be built of varying scale. In smaller SAN environments, fibre channel arbitrated loop topologies employ hub and bridge products. As SANs increase in size and complexity to address flexibility and availability, fibre channel switches may be introduced. One or more fibre channel switches can be referred to as a SAN fabric.

FIG. 1 provides an example of a storage area network (SAN) environment in which the present invention operates. Host 110 serves as a host/server for an application program used by one or more clients (not shown). Host Bus Adapter (HBA) 112 is an interconnect entity between host 110 and fibre channel network 122. An HBA such as HBA 112 is typically a separate card in the host computer system.

Fibre channel switch 120 can be considered to represent the SAN fabric for the fibre channel network 122 corresponding to the SAN. At startup time, typically every host or device on a fibre channel network logs on, providing an identity and a startup address. A fibre channel switch, such as switch 120, catalogs the names of all visible devices and hosts and can direct messages between any two points in the fibre channel network 122. For example, some switches can connect up to $2^{24}$ devices in a cross-point switched configuration. The benefit of this topology is that many devices can communicate at the same time and the media can be shared. Redundant fabric for high-availability environments is constructed by connecting multiple switches, such as switch 120, to multiple hosts, such as host 110.

Storage devices have become increasingly sophisticated, providing such capabilities as allowing input and output to be scheduled through multiple paths to a given disk within a disk array. Such disk arrays are referred to herein as multi-path arrays. Storage array 130 is a multi-path array of multiple storage devices, of which storage device 136 is an example. Storage array 130 is connected to fibre channel network 122 via array port 132.

Storage device 136 is referred to as a logical unit, which has a Logical Unit Number (LUN) 136-LUN. In applications that deal with multiple paths to a single storage device, paths (such as paths 134A and 134B between array port 132 and storage device 136) may also be considered to have their own LUNs (not shown), although the term LUN as used herein refers to a LUN associated with a storage device. Having access to a storage device identified by a LUN is commonly described as having access to the LUN. Having multiple paths assures that storage device 136 is accessible if one of the paths 134A or 134B fails.

Often, vendors of storage devices provide their own application programming interfaces (APIs) and/or command line utilities for using the specialized features of their own storage devices, such as multiple paths to a storage device, but these APIs and command line utilities are not compatible from vendor to vendor. Allocating storage devices for use by a particular application program can be a difficult task when the storage is to be provided by multiple storage devices via a SAN, and each possible storage device has its own specialized features.

One approach to making storage devices easier to use and configure is to create an abstraction that enables a user to view storage in terms of logical storage devices, rather than in terms of the physical devices themselves. For example, physical devices providing similar functionality can be grouped into a single logical storage device that provides the capacity of the combined physical storage devices. Such logical storage devices are referred to herein as "logical volumes," because disk volumes typically provide the underlying physical storage.

FIG. 2 shows an example configuration of two logical volumes showing relationships between physical disks, disk groups, logical disks, plexes, subdisks, and logical volumes. A physical disk is the basic storage device upon which the data are stored. A physical disk has a device name, sometimes referred to as devname, that is used to locate the disk. A typical device name is in the form c#t#d#, where c# designates the controller, t# designates a target ID assigned by a host to the device, and d# designates the disk number. At least one logical disk is created to correspond to each physical disk.

A logical volume is a virtual disk device that can be comprised of one or more physical disks. A logical volume appears to file systems, databases, and other application programs as a physical disk, although the logical volume does not have the limitations of a physical disk. In this example, two physical disks 210A and 210B, having respective device names 210A-N and 210B-N, are configured to provide two logical volumes 240A and 240B, having respective names vol01 and vol02.

A logical volume can be composed of other virtual objects, such as logical disks, subdisks, and plexes. As mentioned above, at least one logical disk is created to correspond to each physical disk, and a disk group is made up of logical disks. Disk group 220 includes two logical disks 230A and 230B, with respective disk names disk01 and disk02, each of which corresponds to one of physical disks 210A and 210B. A disk group and its components can be moved as a unit from one host machine to another. A logical volume is typically created within a disk group.

A subdisk is a set of contiguous disk blocks and is the smallest addressable unit on a physical disk. A logical disk can be divided into one or more subdisks, with each subdisk representing a specific portion of a logical disk. Each specific portion of the logical disk is mapped to a specific region of a physical disk. Logical disk space that is not part of a subdisk is free space. Logical disk 230A includes two subdisks 260A-1 and 260A-2, respectively named disk01-01 and disk01-02, and logical volume 230B includes one subdisk 260B-1, named disk 02-01.

A plex includes one or more subdisks located on one or more physical disks. A logical volume includes one or more plexes, with each plex holding one copy of the data in the logical volume. Logical volume 240A includes plex 250A, named vol01-01, and the two subdisks mentioned previously as part of logical disk 230A, subdisks 260A-1 and 260A-2. Logical volume 240B includes one plex 250B, named vol02-01, and subdisk 260B-1.

None of the associations described above between virtual objects making up logical volumes are permanent; the relationships between virtual objects can be changed. For example, individual disks can be added on-line to increase plex capacity, and individual volumes can be increased or decreased in size without affecting the data stored within.

Data can be organized on a set of subdisks to form a plex (a copy of the data) by concatenating the data, striping the data, mirroring the data, or striping the data with parity. Each of these organizational schemes is discussed briefly below. With concatenated storage, several subdisks can be concatenated to form a plex, as shown above for plex 250A, including subdisks 260A-1 and 260A-2. The capacity of the plex is the sum of the capacities of the subdisks making up the plex. The subdisks forming concatenated storage can be from the same logical disk, but more typically are from several different logical/physical disks.

FIG. 3 shows an example of a striped storage configuration. Striping maps data so that the data are interleaved among two or more physical disks. Striped storage distributes logically contiguous blocks of a plex, in this case plex 310, more evenly over all subdisks (here, subdisks 1, 2 and 3) than does concatenated storage. Data are allocated alternately and evenly to the subdisks, such as subdisks 1, 2 and 3 of plex 310. Subdisks in a striped plex are grouped into "columns," with each physical disk limited to one column. A plex, such as plex 310, is laid out in columns, such as columns 311, 312 and 313.

With striped storage, data are distributed in small portions called "stripe units," such as stripe units su1 through su6. Each column has one or more stripe units on each subdisk. A stripe includes the set of stripe units at the same positions across all columns. In FIG. 3, stripe units 1, 2 and 3 make up stripe 321, and stripe units 4, 5 and 6 make up stripe 322. Thus, if n subdisks make up the striped storage, each stripe contains n stripe units. If each stripe unit has a size of m blocks, then each stripe contains m *n blocks.

Mirrored storage replicates data over two or more plexes of the same size. A logical block number i of a volume maps to the same block number i on each mirrored plex. Mirrored storage with two mirrors corresponds to RAID-1 storage (explained in further detail below). Mirrored storage capacity does not scale—the total storage capacity of a mirrored volume is equal to the storage capacity of one plex.

Another type of storage uses RAID (redundant array of independent disks; originally redundant array of inexpensive disks). RAID storage is a way of storing the same data in different places (thus, redundantly) on multiple hard disks. By placing data on multiple disks, I/O operations can overlap in a balanced way, improving performance. Since multiple disks increase the mean time between failure (MTBF), storing data redundantly also increases fault-tolerance.

A RAID appears to the operating system to be a single logical hard disk. RAID employs the technique of striping, which involves partitioning each drive's storage space into units ranging from a sector (512 bytes) up to several megabytes. The stripes of all the disks are interleaved and addressed in order. Striped storage, as described above, is also referred to as RAID-0 storage, which is explained in further detail below.

In a single-user system where large records, such as medical or other scientific images, are stored, the stripes are typically set up to be small (such as 512 bytes) so that a single record spans all disks and can be accessed quickly by reading all disks at the same time. In a multi-user system, better performance requires establishing a stripe wide enough to hold the typical or maximum size record. This configuration allows overlapped disk I/O across drives.

Several types of RAID storage are described below. RAID-0 storage has striping but no redundancy of data. RAID-0 storage offers the best performance but no fault-tolerance.

RAID-1 storage is also known as disk mirroring and consists of at least two drives that duplicate the storage of data. There is no striping. Read performance is improved since either disk can be read at the same time. Write performance is the same as for single disk storage. RAID-1 storage provides the best performance and the best fault-tolerance in a multi-user system.

RAID-3 storage uses striping and dedicates one subdisk to storing parity information. Embedded error checking information is used to detect errors. Data recovery is accomplished by calculating the exclusive OR (XOR) of the information recorded on the other subdisks. Since an I/O operation addresses all subdisks at the same time, input/output operations cannot overlap with RAID-3 storage. For this reason, RAID-3 storage works well for single-user systems with data stored in long data records. In RAID-3, a stripe spans n subdisks; each stripe stores data on n−1 subdisks and parity on the remaining subdisk. A stripe is read or written in its entirety.

FIG. 4 shows a RAID-3 storage configuration. Striped plex 410 includes subdisks $d_{4-0}$ through $d_{4-4}$. Subdisks $d_{4-0}$ through $d_{4-3}$ store data in stripes 4-1, 4-2 and 4-3, and subdisk $d_{4-4}$ stores parity data in parity blocks $P_{4-0}$ through $P_{4-2}$. The logical view of plex 410 is that data blocks 4-0 through 4-11 are stored in sequence.

RAID-5 storage includes a rotating parity array, thus allowing all read and write operations to be overlapped. RAID-5 stores parity information but not redundant data (because parity information can be used to reconstruct data). RAID-5 typically requires at least three and usually five disks for the array. RAID-5 storage works well for multi-user systems in which performance is not critical or which do few write operations. RAID-5 differs from RAID-3 in that the parity is distributed over different subdisks for different stripes, and a stripe can be read or written partially.

FIG. 5 shows an example of a RAID-5 storage configuration. Striped plex 510 includes subdisks $d_{5-0}$ through $d_{5-4}$. Each of subdisks $d_{4-0}$ through $d_{4-4}$ stores some of the data in stripes 5-1, 5-2 and 5-3. Subdisks $d_{5-2}$, $d_{5-3}$, and $d_{5-4}$ store parity data in parity blocks $P_{5-0}$ through $P_{5-2}$. The logical view of plex 510 is that data blocks 5-0 through 5-11 are stored in sequence.

FIG. 6 shows an example of a mirrored-stripe (RAID-1+0) storage configuration. In this example, two striped storage plexes of equal capacity, plexes 620A and 620B, are mirrors of each other and form a single volume 610. Each of plexes 620A and 620B provides large capacity and performance, and mirroring provides higher reliability. Typically, each plex in a mirrored-stripe storage configuration resides on a separate disk array. Ideally, the disk arrays have independent I/O paths to the host computer so that there is no single point of failure.

Plex 620A includes subdisks $d_{6-00}$ through $d_{6-03}$, and plex 620B includes subdisks $d_{6-10}$ through $d_{6-13}$. Plex 620A contains one copy of data blocks 6-0 through 6-7, and plex 620B contains a mirror copy of data blocks 6-0 through 6-7. Each plex includes two stripes; plex 620A includes stripes 6-1A and 6-2A, and plex 620B includes stripes 6-1B and 6-2B.

FIG. 7 shows an example of a striped-mirror (RAID-0+1) storage configuration. Each of plexes 720A through 720D contains a pair of mirrored subdisks. For example, plex 720A contains subdisks $d_{7-00}$ and $d_{7-10}$, and each of subdisks $d_{7-00}$ and $d_{7-10}$ contains a mirror copy of data blocks 7-0 and 7-4. Across all plexes 720A through 720D, each data block 7-0 through 7-7 is mirrored.

Plexes 720A through 720D are aggregated using striping to form a single volume 710. Stripe 7-11 is mirrored as stripe 7-21, and stripe 7-12 is mirrored as stripe 7-22. The logical view of volume 710 is that data blocks 7-0 through 7-7 are stored sequentially. Each plex provides reliability, and striping of plexes provides higher capacity and performance.

As described above, FIGS. 6 and 7 illustrate the mirrored-stripe and striped-mirror storage, respectively. Though the two levels of aggregation are shown within a volume manager, intelligent disk arrays can be used to provide one of the two levels of aggregation. For example, striped mirrors can be set up by having the volume manager perform striping over logical disks exported by disk arrays that mirror the logical disks internally.

For both mirrored stripes and striped mirrors, storage cost is doubled due to two-way mirroring. Mirrored stripes and striped mirrors are equivalent until there is a disk failure. If a disk fails in mirrored-stripe storage, one whole plex fails; for example, if disk $d_{6-02}$ fails, plex 620A is unusable. After the failure is repaired, the entire failed plex 620A is rebuilt by copying from the good plex 620B. Further, mirrored-stripe storage is vulnerable to a second disk failure in the good plex, here plex 620B, until the failed mirror, here mirror 620A, is rebuilt.

On the other hand, if a disk fails in striped-mirror storage, no plex is failed. For example, if disk $d_{7-00}$ fails, the data in data blocks 7-0 and 7-4 are still available from mirrored disk $d_{7-10}$. After the disk $d_{7-00}$ is repaired, only data of that one disk $d_{7-00}$ need to be rebuilt from the other disk $d_{7-10}$. Striped-mirror storage is also vulnerable to a second disk failure, but the chances are n times less (where n=the number of columns) because striped-mirrors are vulnerable only with respect to one particular disk (the mirror of the first failed disk; in this example, $d_{7-10}$). Thus, striped mirrors are preferable over mirrored stripes.

Configuring a logical volume is a complex task when all of these tradeoffs between performance, reliability, and cost are taken into account. Furthermore, as mentioned above, different vendors provide different tools for configuring logical volumes, and a storage administrator in a heterogeneous storage environment must be familiar with the various features and interfaces to establish and maintain a storage environment with the desired capabilities. Furthermore, a storage administrator must keep track of how particular volumes are implemented so that subsequent reconfigurations of a logical volume do not render the logical volume unsuitable for the purpose for which the logical volume was created.

A solution is needed that enables a user to provide a high-level specification of storage requirements for a logical volume without having detailed knowledge of the underlying vendor-specific APIs and command line utilities for each possible storage device. Preferably, the system would implement the high-level specification in hardware and/or software without further direction from the user so that the user does not need knowledge of how to implement the logical volume.

SUMMARY OF THE INVENTION

The present invention provides a method, system, and computer program product to enable a user to provide a high-level specification of storage requirements without having detailed knowledge of the underlying vendor-specific APIs and command line utilities for each possible storage device used to meet the storage requirements. The user does not specify how to implement the storage requirements. The system implements the high-level specification in hardware and/or software without further direction from the user.

BRIEF DESCRIPTION OF THE DRAWINGS

The present invention may be better understood, and its numerous objects, features and advantages made apparent to those skilled in the art by referencing the accompanying drawings.

FIGS. 12 through 20 provide an example of a graphical user interface for allocating storage in accordance with one embodiment of the present invention.

FIG. 12 is an example of an administration window of the graphical user interface of the present invention.

FIG. 13 shows examples of functions available for a currently selected host in the graphical user interface of FIG. 12.

FIG. 14 is an example of a capabilities selection window of the graphical user interface described above.

FIG. 15 is an example of an parameters page for specifying values of parameters for a capability.

FIG. 16 is an example of a window enabling the user to specify a rule for configuration of a logical volume.

FIG. 17 is an example of an attribute selection window for specifying attribute values for a rule.

FIG. 18 is an example of a template selection window allowing the user to specify a user template to be used to create a logical volume.

FIG. 19 is an example of a disk selection window for selecting a particular hardware disk to provide storage for a logical volume.

FIG. 20 is a summary page summarizing the user's functional description of a logical volume to be created.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

Today, with the proliferation of intelligent disk arrays, the storage devices available in a disk array provide many features. Through SANs, hosts now have access to hundreds of thousands of storage devices having a variety of properties. Because of these factors, configuring logical volumes in a given environment is no longer a trivial problem. The present invention facilitates logical volume configuration through use of a powerful allocation specification language, method, system and computer program product. The user can specify the capabilities that are desired from the logical volume as a high-level description of characteristics of the logical volume, and the storage allocator translates the high level description of characteristics into commands necessary to configure physical storage devices to provide those capabilities.

Figure 1:
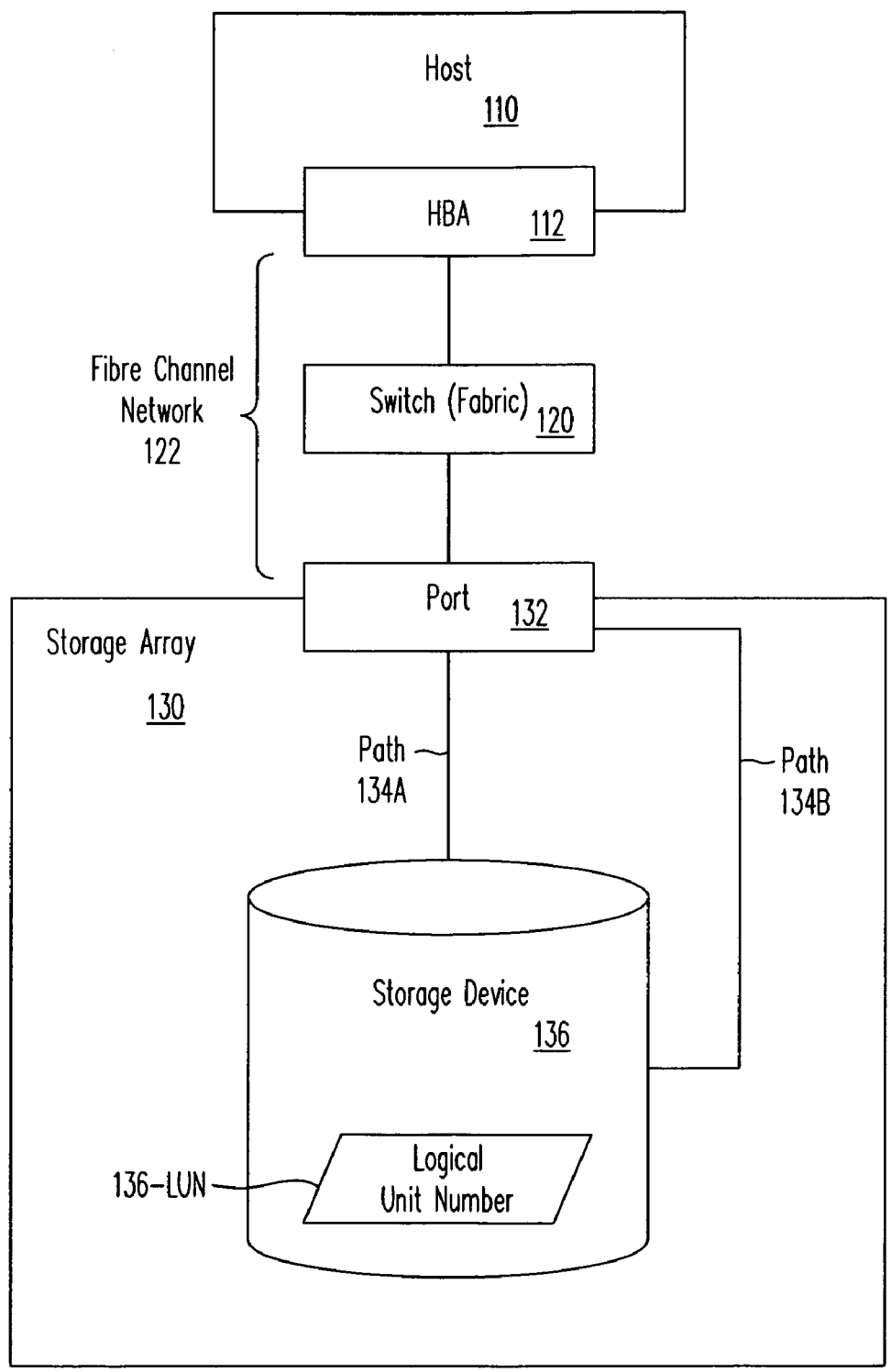
FIG. 1 is an example of a storage area network environment in which the present invention operates, as described above.
Figure 2:
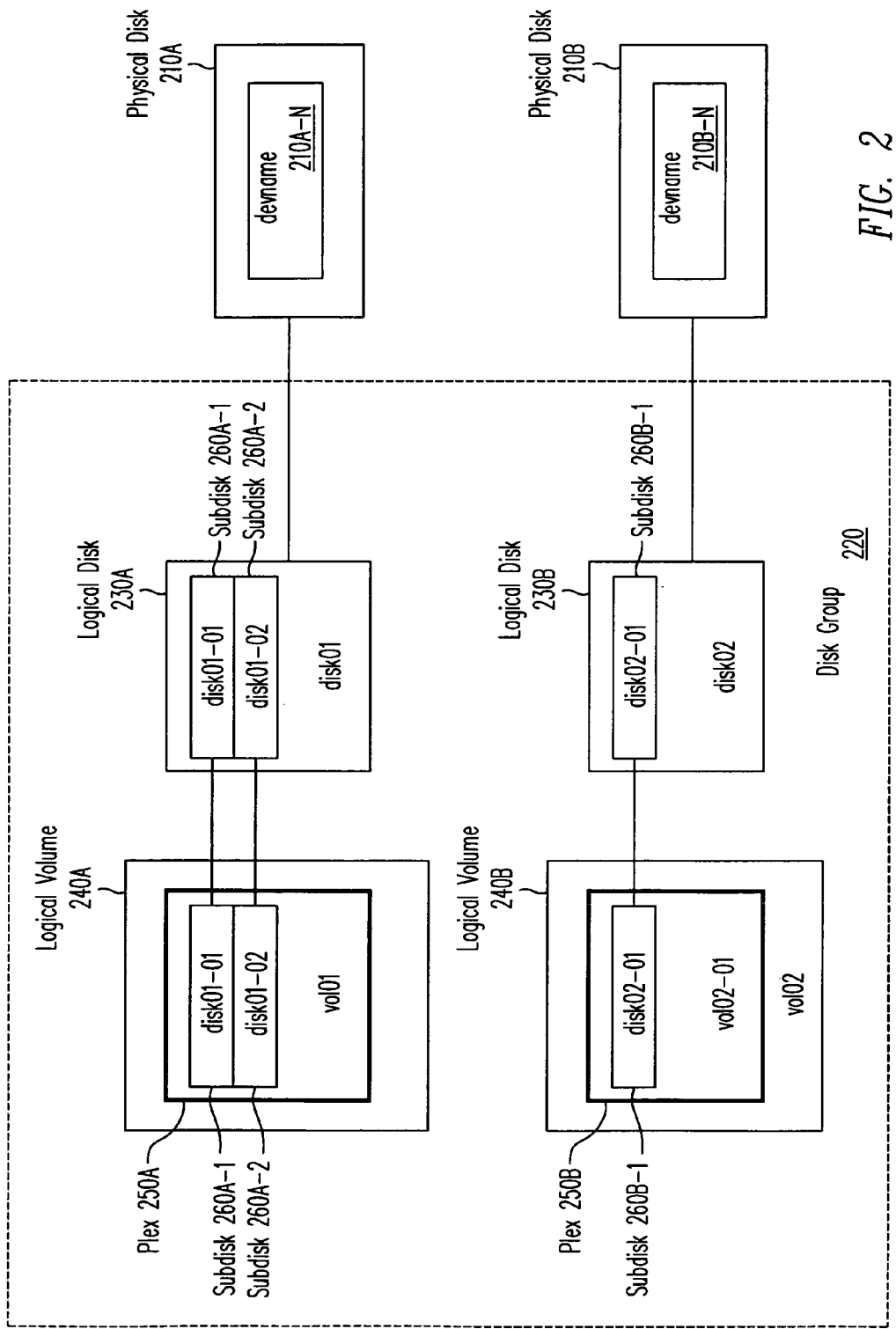
FIG. 2 shows an example configuration of two logical volumes showing relationships between physical disks, disk groups, logical disks, plexes, subdisks, and logical volumes, as described above.
Figure 3:
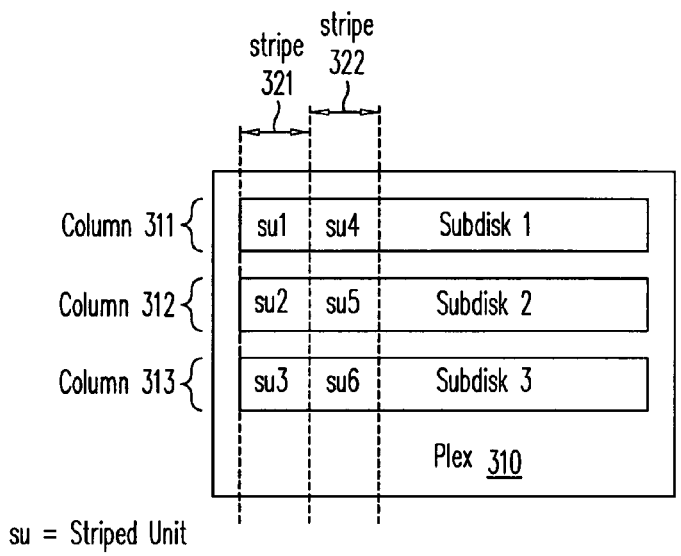
FIG. 3 shows an example of a striped storage configuration, as described above.
Figure 8:
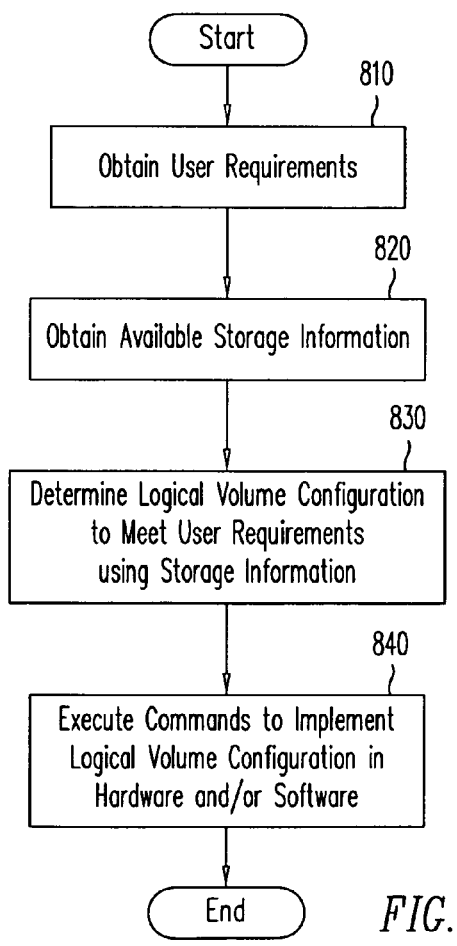
FIG. 8 is an example of a flowchart showing the operation of one embodiment of the present invention.

FIG. 8 is an example of a flowchart showing the operation of one embodiment of the present invention. In "Obtain User Requirements" step 810, functional requirements for a logical volume are obtained from a user. The term 'user' is used herein to indicate either a person or a software module that uses the storage allocation services of the present invention. The term 'user requirements' is used herein to indicate a high-level description of at least one characteristic of the logical volume. User requirements need not include directions for implementing the requested characteristics, as the best implementation to provide the desired characteristics can be determined by the storage allocator. In one embodiment, these user requirements are provided in the form of the allocation language described herein. User requirements can be provided by a person using a graphical user interface (GUI). In other embodiments, user requirements may be obtained from other types of interfaces, such as a command line interface, or from another software module.

In "Obtain Available Storage Information" step 820, information is gathered about the available storage for implementing the user requirements. This information can be gathered from storage devices directly attached to the host running the system software, via a network from other hosts directly attached to other storage devices, and from servers on a storage area network.

In "Produce Logical Volume Configuration to Meet User Requirements using Storage Information" step 830, the available storage information is searched for storage suitable for providing the specified user requirements. From the available storage, a logical volume configuration is determined that can be used to implement the user requirements using the available storage devices.

In "Execute Commands to Implement Logical Volume Configuration in Hardware and/or Software" step 840, the logical volume configuration is used to determine a series of commands to implement the logical volume. The series of commands is executed to configure available storage devices to provide a logical volume to meet the user requirements.

In one embodiment of the invention, the following functionality is supported:

Creating logical volumes
Growing logical volumes online
Creating/Adding logs to logical volumes
Adding mirrors to logical volumes online
Relocating a logical volume sub-disk
Reconfiguring logical volume layout
Creating software snapshot
Creating hardware snapshot
Providing support for intelligent storage array policies The user specifies one or more of these functions, along with functional requirements to be met by the storage implementing the function, and the steps of FIG. 8 are followed to configure the hardware and/or software to provide the logical volume meeting the user's functional requirements. Each of the steps of FIG. 8 is discussed in further detail below. In the examples that follow, creating a logical volume is used as an example of operation of the present invention. However, one of ordinary skill in the art will appreciate that the above functions can be also be performed using the system, methods, language and computer program product described herein.

Figure 9:
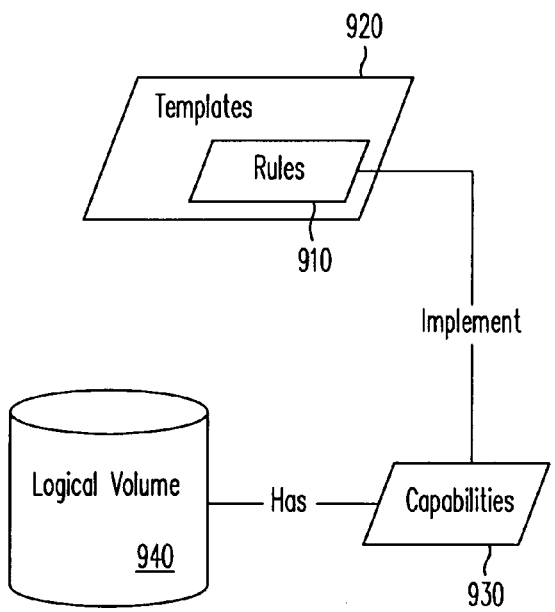
FIG. 9 is a diagram showing the relationship between templates, rules, capabilities, and a logical volume in accordance with one embodiment of the present invention.
Figure 4:
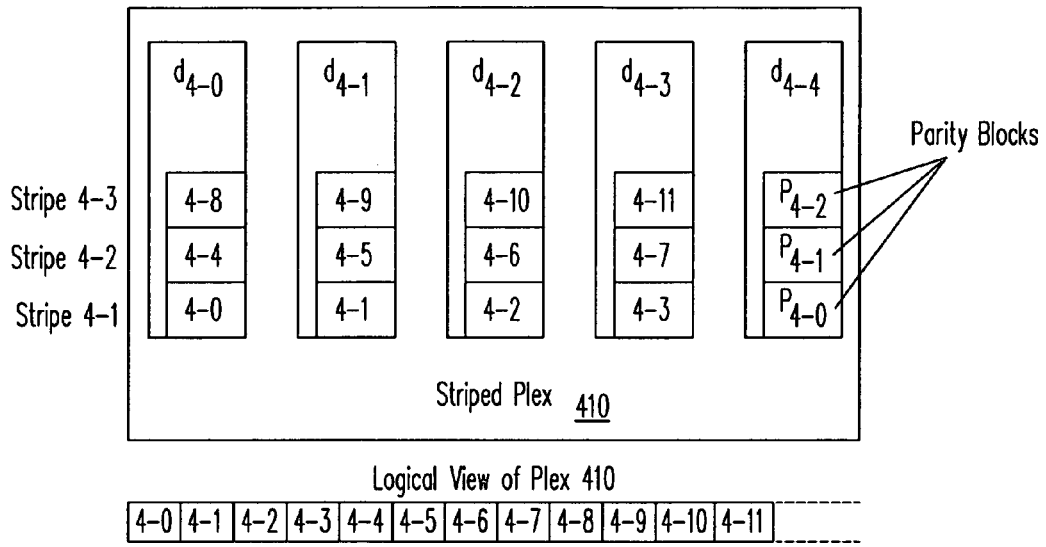
FIG. 4 shows an example of a RAID-3 storage configuration, as described above.
Figure 5:
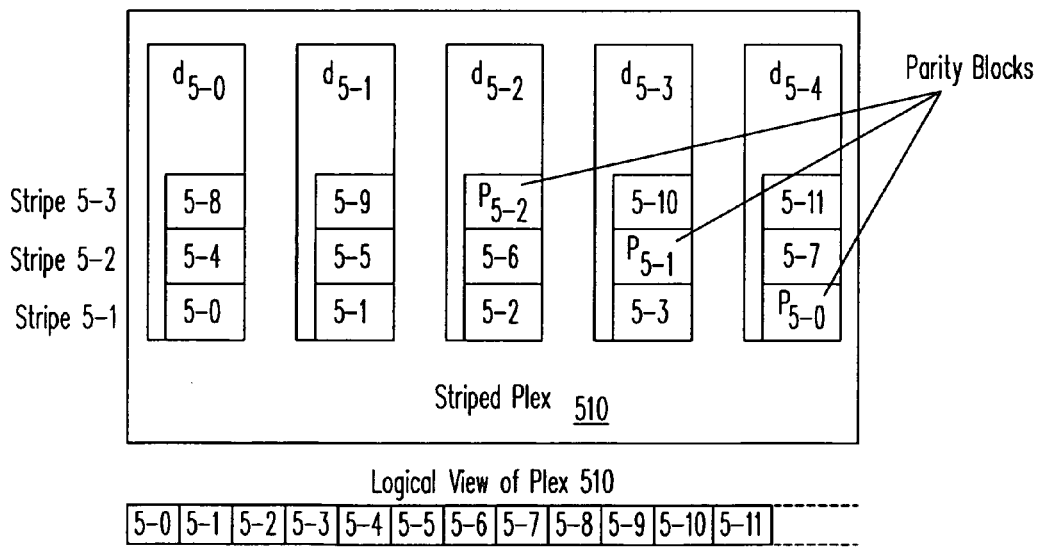
FIG. 5 shows an example of a RAID-5 storage configuration, as described above.
Figure 6:
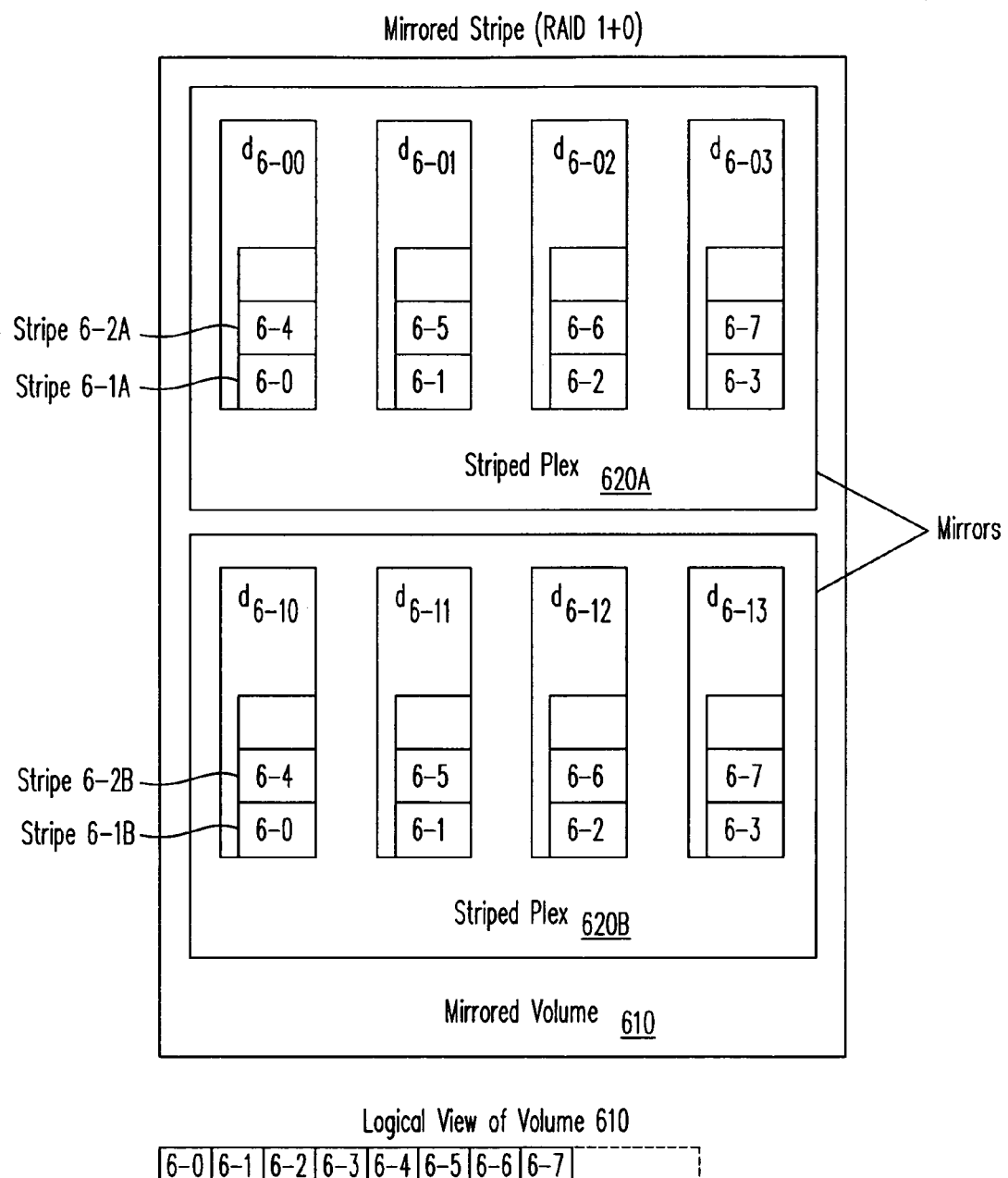
FIG. 6 shows an example of a mirrored-stripe (RAID-1+0) storage configuration, as described above.
Figure 7:
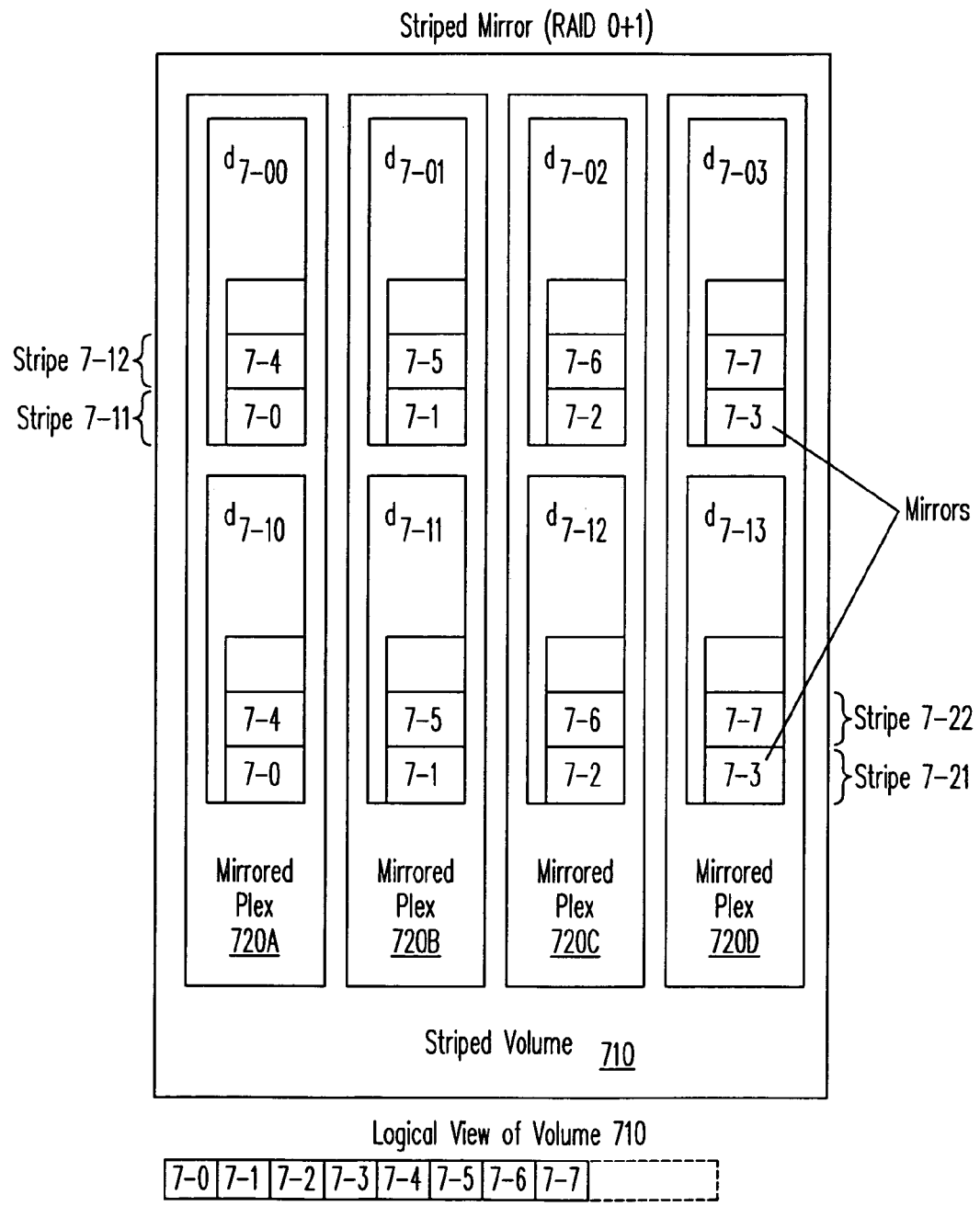
FIG. 7 shows an example of a striped-mirror (RAID-0+1) storage configuration, as described above.

A configuration for a logical volume can be specified using rules, templates, capabilities, and/or user templates, also referred to herein as application-specific templates. FIG. 9 shows the relationship between templates, rules, capabilities, and a logical volume in accordance with one embodiment of the present invention. Rules 910 are included within templates 920, because templates are a collection of rules. Rules and templates implement capabilities 930, and logical volume 940 can be configured to provide those capabilities 930. Logical volume 940 may be implemented using one or more physical storage devices, some of which may already possess physical characteristics, such as striping, that enable the device to provide certain capabilities, such as high performance, inherently. Logical volume 940 can have one or more capabilities implemented by one or more templates and/or rules. To ensure that logical volume 940 meets user requirements, a combination of physical characteristics of some storage devices and software configuration of other storage devices using rules can be used to provide all capabilities meeting the user requirements. Rules, templates, capabilities, and user templates are described in further detail below.

Architecture

Figure 10:
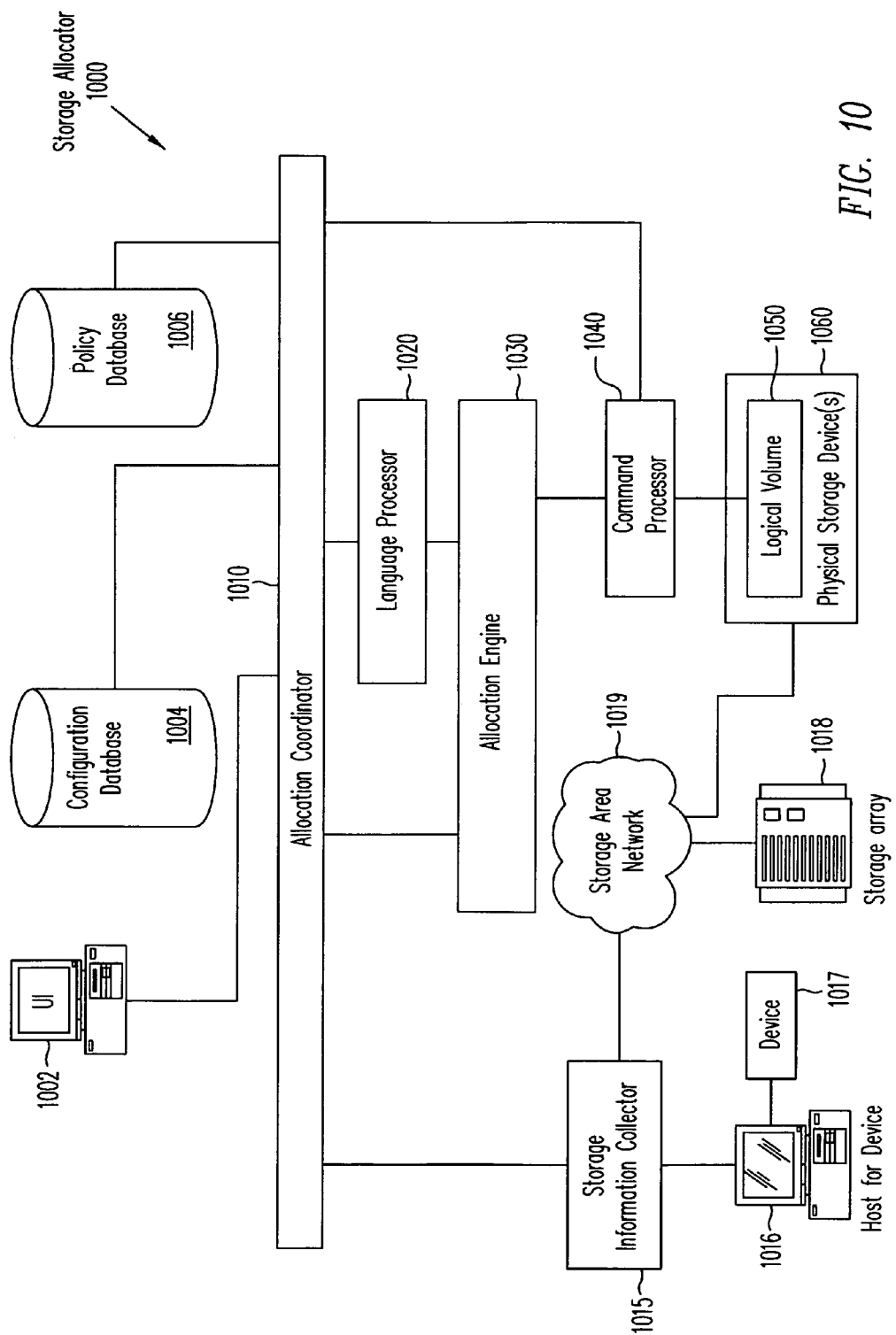
FIG. 10 is a diagram of a system implementing one embodiment of the present invention.

FIG. 10 is a diagram of a system implementing one embodiment of the present invention. Storage allocator 1000 is composed of different modules that communicate using well-defined interfaces; in one embodiment, storage allocator 1000 is implemented as a storage allocation service. An allocation coordinator 1010 coordinates communication among the various modules that provide the functionality of storage allocator 1000. In the above-described embodiment, allocation coordinator 1010 includes a set of interfaces to the storage allocation service implementing storage allocator 1000. A user interface (UI) 1002 is provided to enable users to provide user requirements for a logical volume.

Allocation coordinator 1010 obtains data from configuration database 1004, which includes data about templates, capabilities, rules, and policy database 1006, which contains information about storage environment policies. An example of a policy is a specification of a stripe unit width for creating columns in a striped virtual object; for example, columns of a striped volume may be configured having a default stripe unit width of 128 K. Allocation coordinator 1010 also obtains information about the available storage environment from storage information collector 1015. As shown, storage information collector 1015 collects information from hosts for storage devices, such as host 1016 for storage device 1017, storage array 1018, and storage area network 1019. Information about available storage may be provided in the form of storage objects. Storage information collector 1015 may be considered to correspond to a storage information-obtaining module, means, and instructions.

Allocation coordinator 1010 communicates with a language processor 1020. Language processor 1020 interprets input in the form of the allocation specification language and input describing available storage information. Both allocation coordinator 1010 and language processor 1020 communicate with allocation engine 1030, which accepts input in the form of an allocation language specification and provides output to command processor 1040. In one embodiment, allocation engine 1030 provides output in the form of a logical volume configuration specified as a virtual object hierarchy, which is explained in further detail below.

By automatically producing a logical volume configuration, allocation engine 1030 can be considered to be a producing module, means, and instructions. Allocation engine 1030 can also be considered to be a selecting module, means, and instructions because allocation engine 1030 selects the hardware to be configured to produce the logical configuration. In addition, allocation engine 1030 can be considered to be a configuration module, means, and instructions as well as a reconfiguration module, means, and instructions because allocation engine 1030 ensures that a logical volume conforms to a logical volume configuration both at the time of initial configuration and for each subsequent reconfiguration. Ensuring that a logical volume conforms to the logical volume configuration's rules consistently enables the logical volume to be consistently available. For example, the logical volume can be configured to meet a 99.99% level of availability if the appropriate capabilities and rules are used. Allocation engine 1030 can be considered an availability-providing module, means or instructions.

Command processor 1040 accepts input from allocation engine 1030 and produces commands that, when executed, create logical volume 1050 on physical storage device(s) 1060. As shown in this example, physical storage devices 1060 are accessible via storage area network 1019, although it is not necessary for operation of the invention that the storage devices used to implement the logical volume are accessible via a storage area network. For example, storage devices such as device 1017 could be configured to provide the logical volume.

In one embodiment, command processor 1040 obtains input in the form of a logical volume configuration specified as a virtual object hierarchy and produces commands as output. In this embodiment, command processor 1040 can also operate in reverse; command processor 1040 can produce a virtual object hierarchy as output using inputs in the form of a specification of intent (not shown) and the virtual objects (not shown) that make up logical volume 1050 previously created by the commands. This modular design, in combination with abstractions like virtual objects and storage objects, makes the entire architecture flexible.

Command processor 1040 executes the commands to configure physical storage devices to conform to a logical volume configuration. As such, command processor 1040 can be considered to be an executing module, means, and instructions.

The functions performed by allocation engine 1030 are computationally expensive. The functionality of the system described above can be implemented in various system configurations. For example, a separate computer system may be designated to perform the functionality of allocation engine 1030. In such a configuration, allocation engine 1030 resides on a host different from the host for command processor 1040. An allocation proxy also can run on the host where command processor 1040 is running to provide the logical volume configuration in the form of a virtual object hierarchy to the remote command processor 1040.

A user may specify the desired configuration for a logical volume by using a user interface in one of several forms. For example, the user interface may be in the form of a graphical user interface, a set of selection menus, a command line interface, or, in the case of a software module user, an application programming interface or method of inter-process communication. One embodiment allows the user to specify user requirements as a high-level description of at least one characteristic of the logical volume, such as "survive failure of one path to a disk."

These user requirements can be translated into a "capability specification" including one or more capabilities of the logical volume. Capabilities can be specified directly as a part of user requirements or determined to be necessary by allocation engine 1030 to meet user requirements. Therefore, allocation engine 1030 can be considered to be a capability-requiring module, means, and instructions. In addition, capabilities not specified as part of user requirements nevertheless can be required by the storage allocator, for example, to maintain storage policies in the storage environment. For example, a policy to limit a logical volume to contain no more than 100,000 database records can result in a requirement that a certain capability, such as storing the data on different disks, be provided. Furthermore, capabilities not specified as a user requirement may also be required by a template used to provide another capability.

One embodiment can also allow the user to select from a list of capabilities with which physical devices can be configured and/or selected to provide the logical volume. Another embodiment allows the user to select from a set of user templates preconfigured as suitable for storing application-specific data, such as database tables. In addition, one embodiment allows the user to specify rules to configure the logical volume and to save those rules as a user template that can be used later.

The user interface described above may be considered to be a requesting module, means, and instructions to enable a user to request that a logical volume be configured according to user requirements. The user interface may be considered to be a capability-obtaining module, means or instructions to enable the user to request capabilities for a logical volume; a template-obtaining module that enables the user to specify a user template to be used to configure the logical volume; and/or a rule-obtaining module to enable the user to specify a rule to be used to configure the logical volume.

Figure 11A:
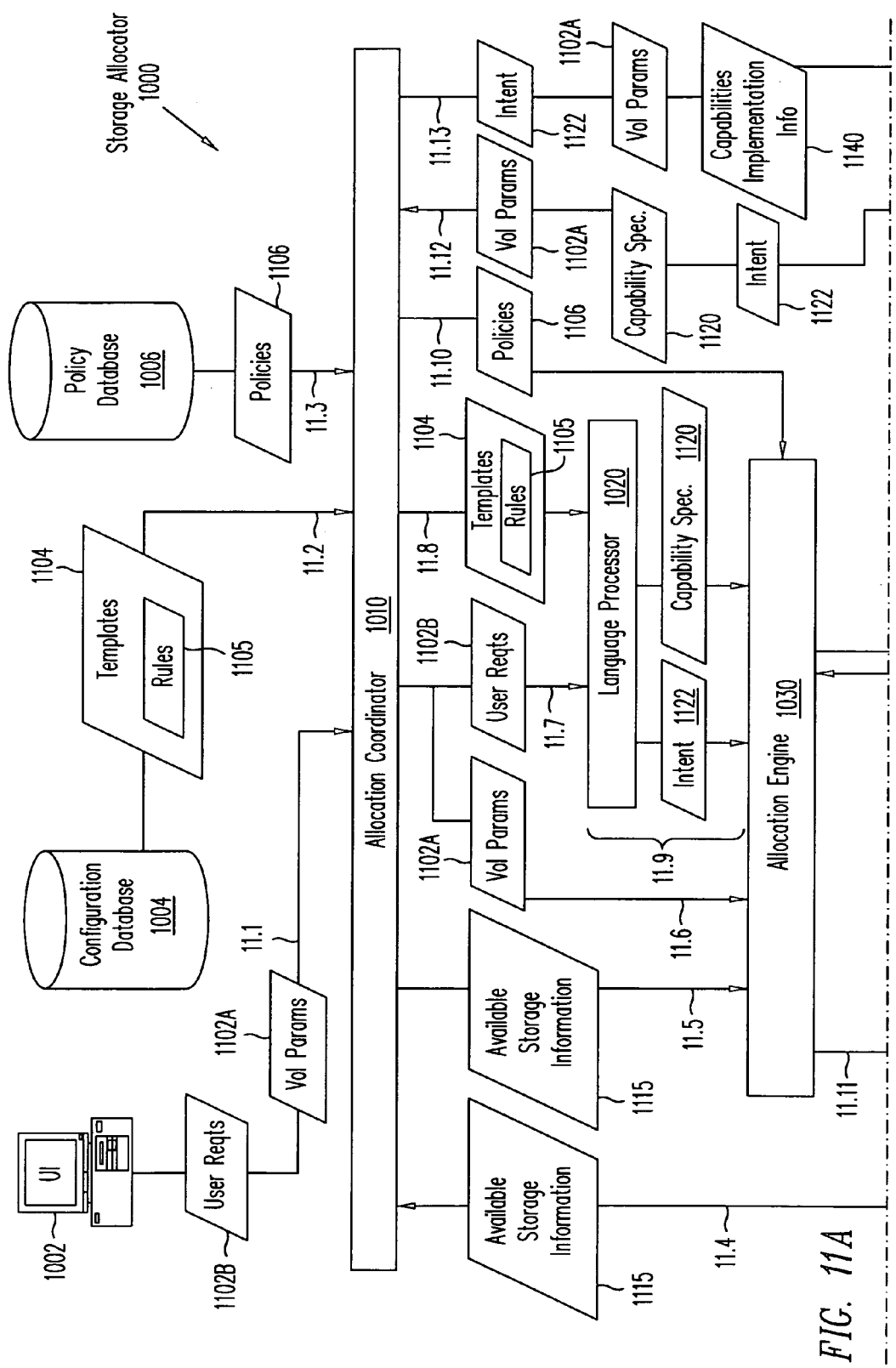
FIG. 11 shows data flows through the system of FIG. 10 in accordance with one embodiment of the present invention.

FIG. 11 shows data flows through the system of FIG. 10 in accordance with one embodiment of the present invention. In action 11.1, volume parameters 1102A, which are user requirements in the form of text, such as the name to be given to the logical volume, and user requirements 1102B are passed from user interface 1002 to allocation coordinator 1010. User requirements 1102B can be provided in the form of a high-level specification, such as "provide high performance." User requirements 1102B may also be provided as a description of an intended use for a logical volume, such as "store database tables." In action 11.2, templates 1104 including rules 1105 are passed from configuration database 1004 to allocation coordinator 1010, and in action 11.3, policies 1106 are passed from policy database 1106 to allocation coordinator 1010. While allocation coordinator 1010 is shown as receiving data from some components of storage allocator 1000 and passing the data to other components of storage allocator 1000, one of skill in the art will recognize that allocation coordinator 1010 may be implemented as a set of interfaces through which the data pass from one component of storage allocator 1000 to another.

In action 11.4, storage information collector 1015 produces available storage information 1115 and provides it to allocation coordinator 1010. Inaction 11.5, allocation coordinator provides available storage information 1115 to allocation engine 1030. In action 11.6, allocation coordinator 1010 provides volume parameters 1102A to allocation engine 1030, and in action 11.7, allocation coordinator 1010 provides user requirements 1102B to language processor 1030. In action 11.8, allocation coordinator provides templates 1104 and rules 1105 to language processor 1020. In action 11.9, language processor 1020 produces and provides intent 1122 and capability specification 1120 to allocation engine 1030. Intent 1122 captures information such as user requirements 1102B, including high-level descriptions of characteristics requested of the logical volume (i.e., "provide high performance") and/or rules or capabilities used to configure the logical volume for an intended use. In one embodiment, capability specification 1120 is provided in the form of text describing capabilities and variable values either specified by the user or required by a template to implement capabilities satisfying the user requirements. In action 11.10, allocation coordinator 1010 provides policies 1006 to allocation engine 1030.

In action 11.11, allocation engine 1030 processes inputs available storage information 1115, intent 1122, capability specification 1120, policies 1106, and volume parameters 1102A to produce capabilities implementation information 1140. Capabilities implementation information 1140 includes a selection of rules chosen to implement a logical volume based upon available storage information 1115. Allocation engine 1030 uses capabilities implementation information 1140 and available storage information 1115 to produce logical volume configuration 1130. In action 11.12, allocation engine 1030 provides intent 1122, capability specification 1120, logical volume configuration 1130, capabilities implementation information 1140, and volume parameters 1102A to allocation coordinator 1010.

In action 11.13, allocation coordinator 1010 provides volume parameters 1102A, capability specification 1120, intent 1122, capabilities implementation information 1140, and logical volume configuration 1130 to command processor 1040. In action 11.14, command processor 1040 produces and executes the commands to configure logical volume 1050 according to the user requirements 1102. In action 11.15, command processor 1040 provides intent 1122, capability specification 1120, and capabilities implementation information 1140 to be stored with logical volume 1050 on physical storage device(s) 1060. By associating the volume creator's intent 1122 with logical volume 1050, command processor 1040 can be considered to be an associating module, means, and instructions.

The example system described in FIGS. 10 and 11 implements each of the steps previously described with regard to FIG. 8. Each of these steps is described in further detail below.

Obtaining User Requirements

In one embodiment, user requirements can be specified as a high-level specification of characteristics desired of the logical volume, such as "Survive failure of two disks." The term 'user' is used herein to indicate either a person or a software module that uses the storage allocator of the present invention. In another embodiment, the user can specify capabilities for a logical volume, such as Reliable, High Performance, Snapshot-capable, and so on. The system can then determine the best rules and/or templates to provide the requested capabilities, thereby allowing flexibility in implementing a set of capabilities. Capabilities can have parameters for which the user may enter values, thereby allowing further customization of the allocated storage. In another embodiment, the user can select from a set of application-specific templates, also referred to as user templates, which are pre-configured to meet the needs of a particular type of application, such as a database management system.

FIGS. 12 through 20 provide an example of a graphical user interface for allocating storage in accordance with one embodiment of the present invention. The functions made possible via the graphical user interface shown can also be performed via a command line or via API calls, but the graphical user interface illustrates the high level at which the user can specify functional requirements or a user template to be used to create a logical volume.

Figure 12:
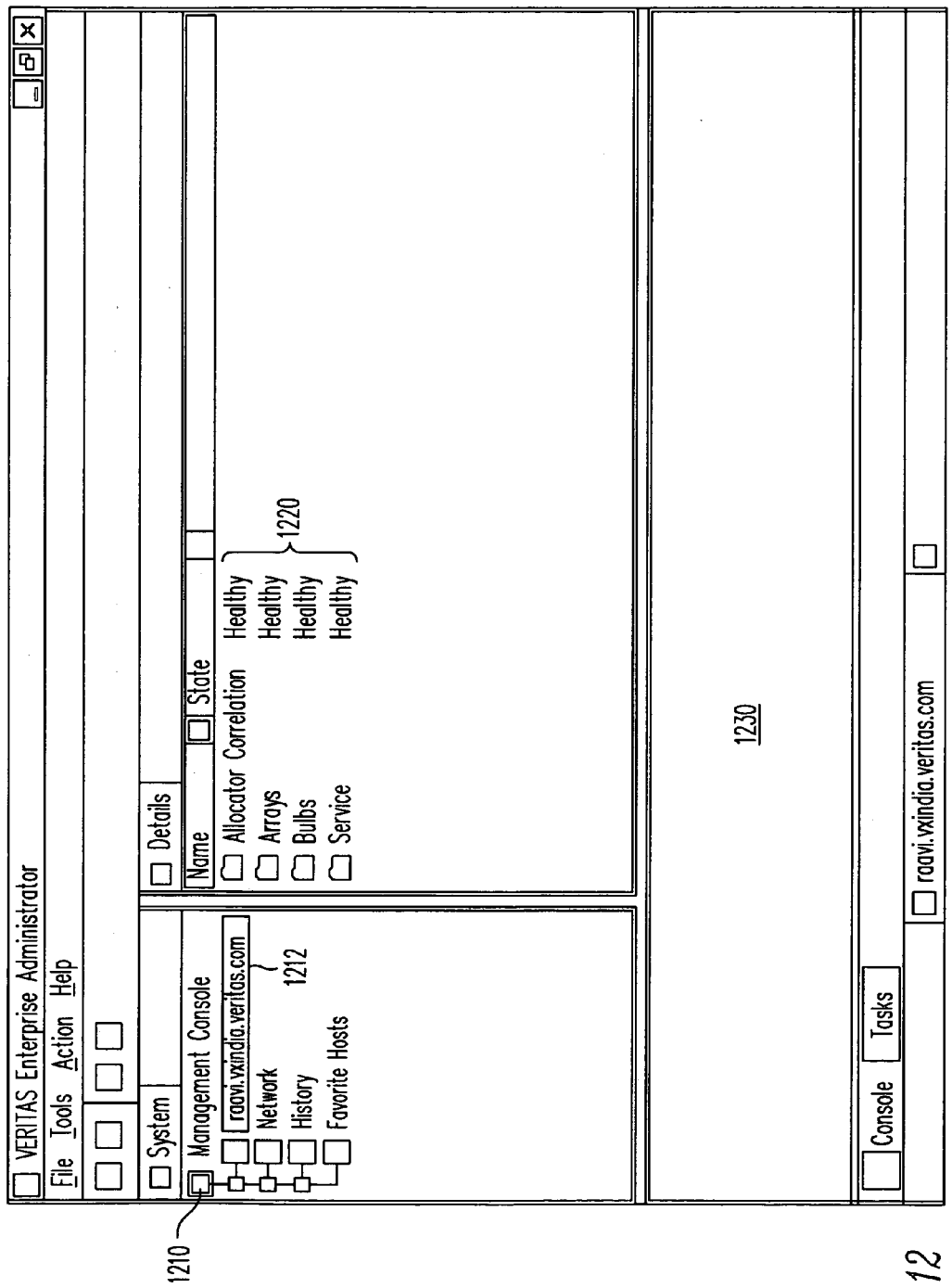

FIG. 12 is an example of an administration window of the graphical user interface of the present invention. In addition to the standard menu bar, task bar, and status area, the main window is divided into panes, including object tree pane 1210, in which the host to which the user is currently connected appears as a node. In this example, the user is connected to host 1212 entitled "raava.vxindia.veritas.com." In pane 1220, the details of the disks attached to host 1212 are provided. Each of the four disks connected to the currently selected host is in a "healthy" state. In pane 1230, details of tasks being carried out on the currently selected host are shown. In this example, no tasks are currently running on host 1212. The user can right-click on the name of the host 1212 to view a menu of functions available for host 1212, as shown in FIG. 13.

Figure 13:
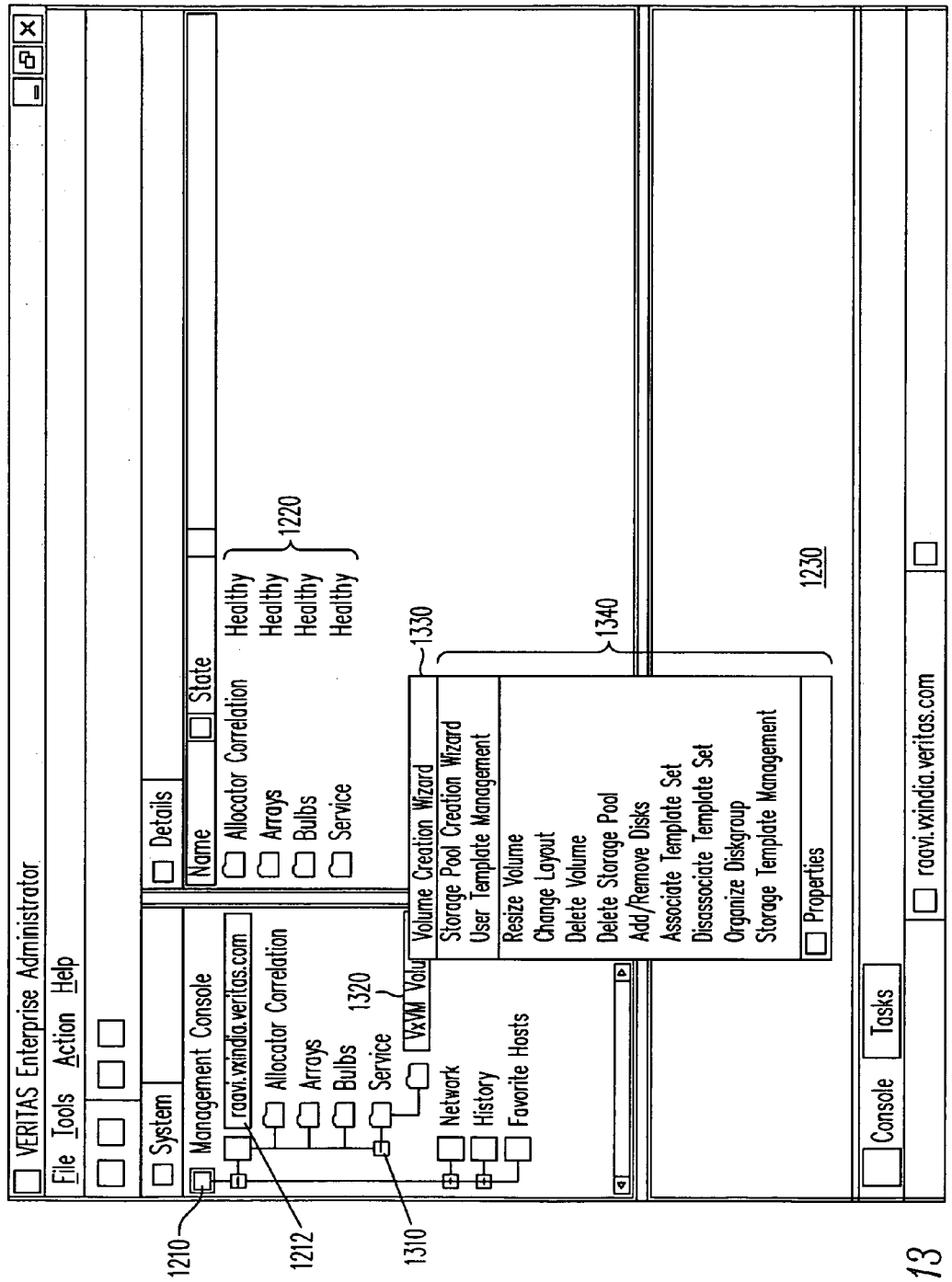

FIG. 13 shows examples of functions available for a currently selected host in the graphical user interface of FIG. 12. As shown in FIG. 12, object tree 1210 shows that host 1212, entitled "raava.vxindia.veritas.com" is currently selected. Service group 1310 includes "VxVM Volume Allocator" 1320, which provides storage allocation functions for logical volumes.

In this example, the following functions can be selected, as shown in pop-up window 1340:
Volume creation
Storage pool creation
User template management
Resize [Logical] Volume
Change Layout
Delete Volume
Delete Storage Pool
Add/Remove Disks
Associate Template Set
Disassociate Template Set
Organize Disk Group Storage Template Management In the current example, "Volume Creation Wizard" 1330 is selected from pop-up window 1340 as the function to be performed. The volume creation function will be described in further detail below.

Figure 14:
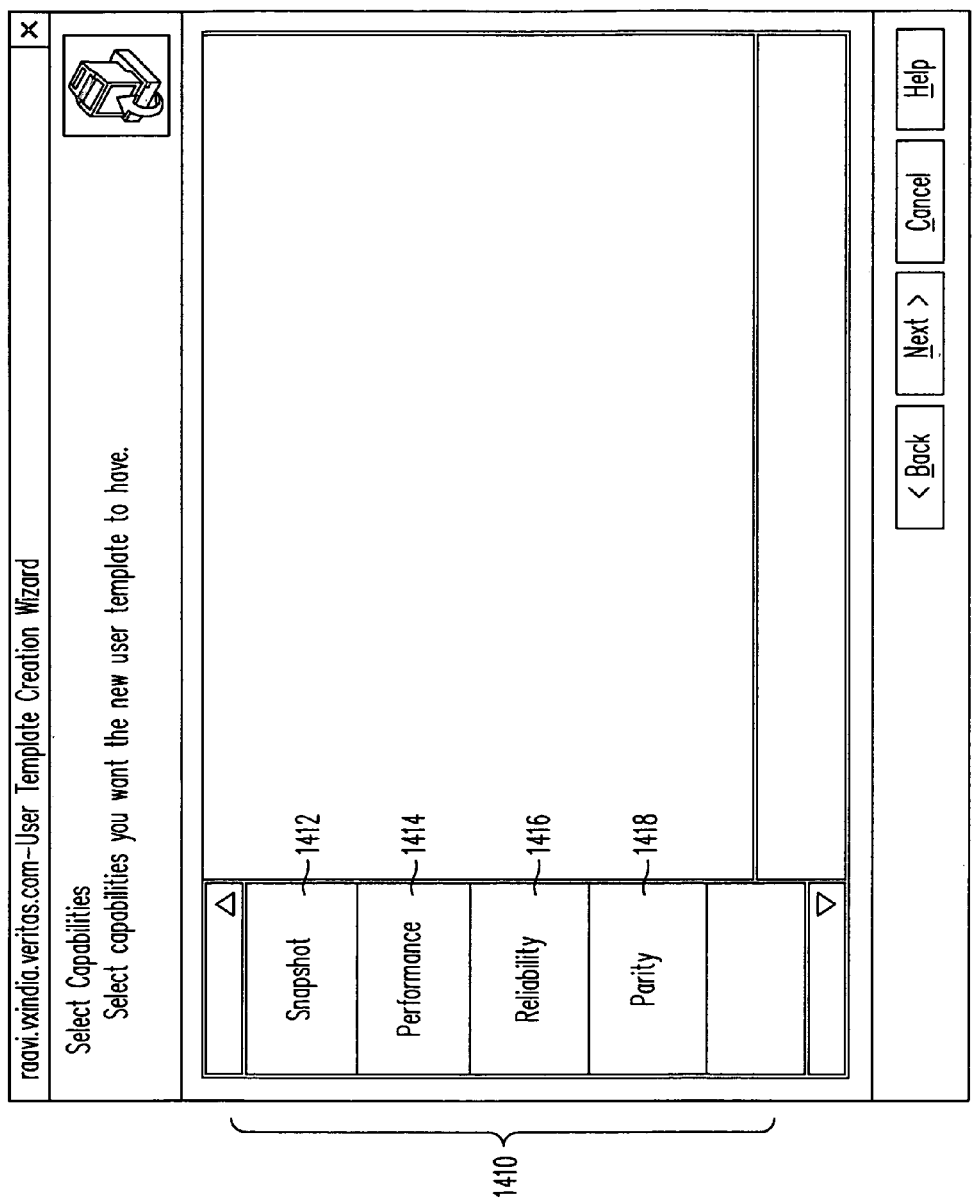

FIG. 14 is an example of a capabilities selection window of the graphical user interface described above. Pane 1410 includes a button for each "root" capability that can be configured for a logical volume, including snapshot button 1412, Performance button 1414, Reliability button 1416, and Parity button 1418. If a given capability has capabilities that derive from the selected "root" capability, those capabilities are shown in pane 1420 when the capability is selected. Currently, no capability is selected.

Figure 15:
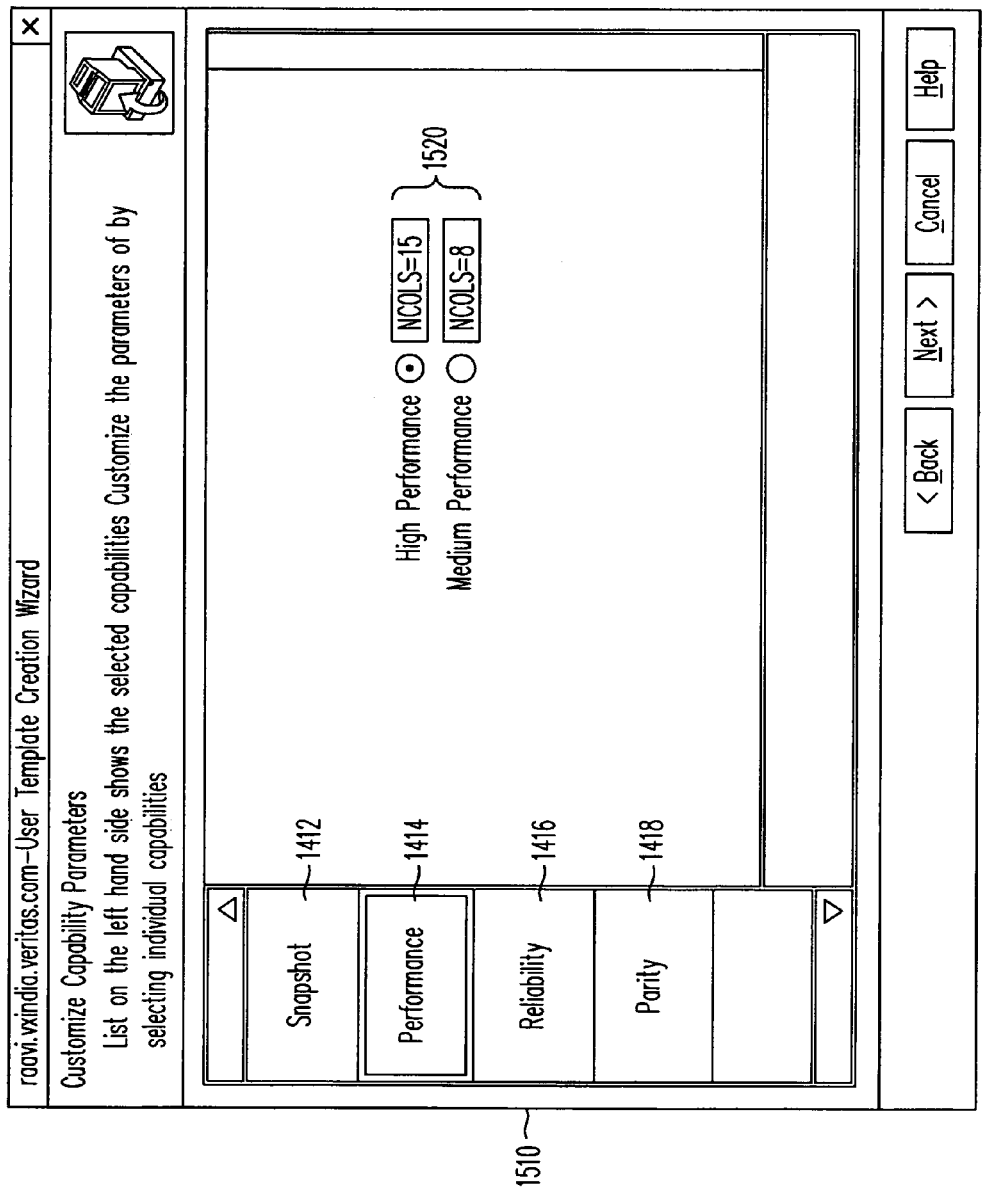

FIG. 15 is an example of a parameters page for specifying values of parameters for a capability. The parameters page shown includes a pane 1510 showing the capability selected on a previous capabilities selection window such as that shown in FIG. 14, in this case, the Performance capability. In pane 1520, parameters related to the capability for which the user may enter values are shown. The user may select a high performance or medium performance level, and default values of parameters are shown. For a high performance level, a default of 15 columns are specified using the NCOLS parameter, and for a medium performance level, a default of 8 columns are specified. As another example (not shown), the Reliability capability may allow the user to specify path reliability, disk reliability, or both.

Figure 16:
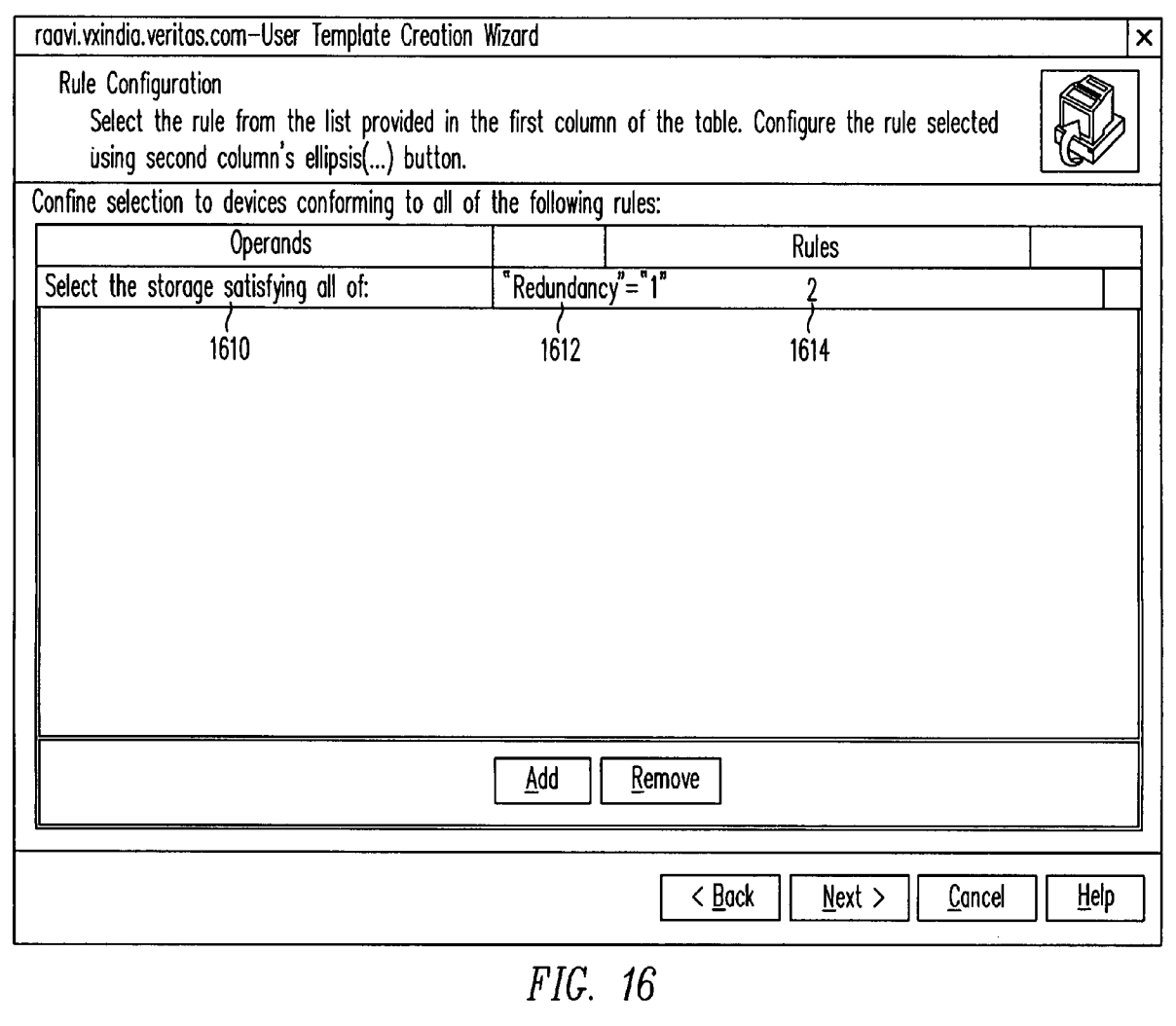

FIG. 16 is an example of a window enabling the user to specify a rule for configuration of a logical volume. A user may select an operand, such as all of (indicating that all of the rules must be satisfied), etc. from a list of operands provided by clicking on combo box 1610 in the left-hand column. The rule can be specified by selecting from a list of rules, provided in a combo box 1612. In this example, the redundancy rule has been configured with a value of 2, indicating that one redundant copy of the data is kept. To obtain a list of available rules, in one embodiment, the user can click on button 1614.

Figure 17:
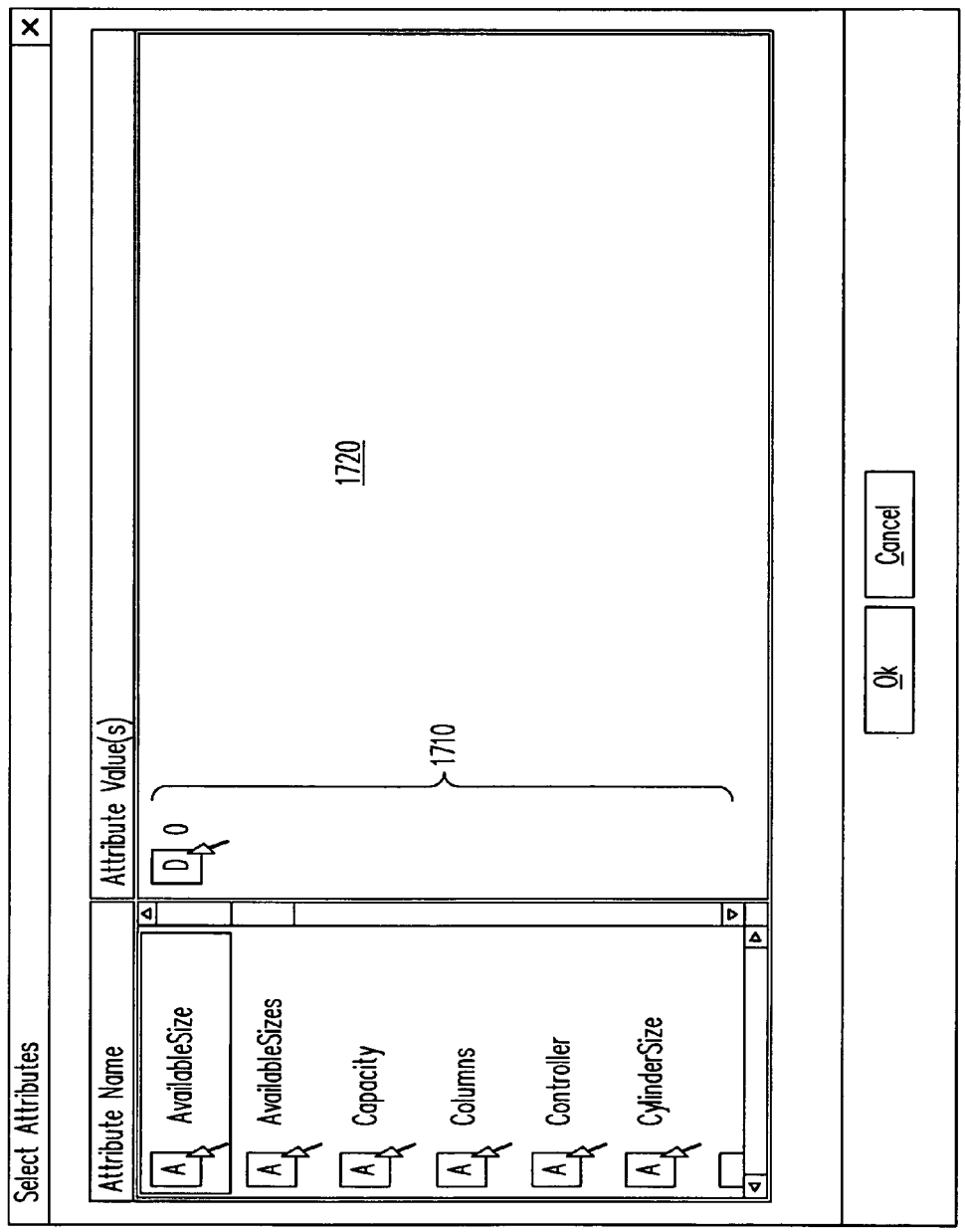

FIG. 17 is an example of an attribute selection window for specifying attribute values for a rule. Attribute names appear in list box 1710, and values for the selected attribute (in this case, AvailableSize) appear in pane 1720.

Figure 18:
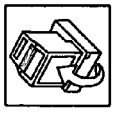

FIG. 18 is an example of a template selection window allowing the user to specify a user template to be used to create a logical volume. FIG. 18 provides the user with an alternative to specifying capabilities to configure to logical volume. In this example, the user can choose between pre-existing templates 1820 configured to meet the needs of specific applications. In addition, the user has an option to create a new template using a template creation wizard 1818. The user specifies a volume name 1810, a volume size 1812, volume size units 1814, and a disk group name 1816. In this example, available templates 1820 include options for pre-configured templates for storing Oracle tables and text documents. User plate descriptions 1822 includes a description of the function of each user template.

Figure 19:
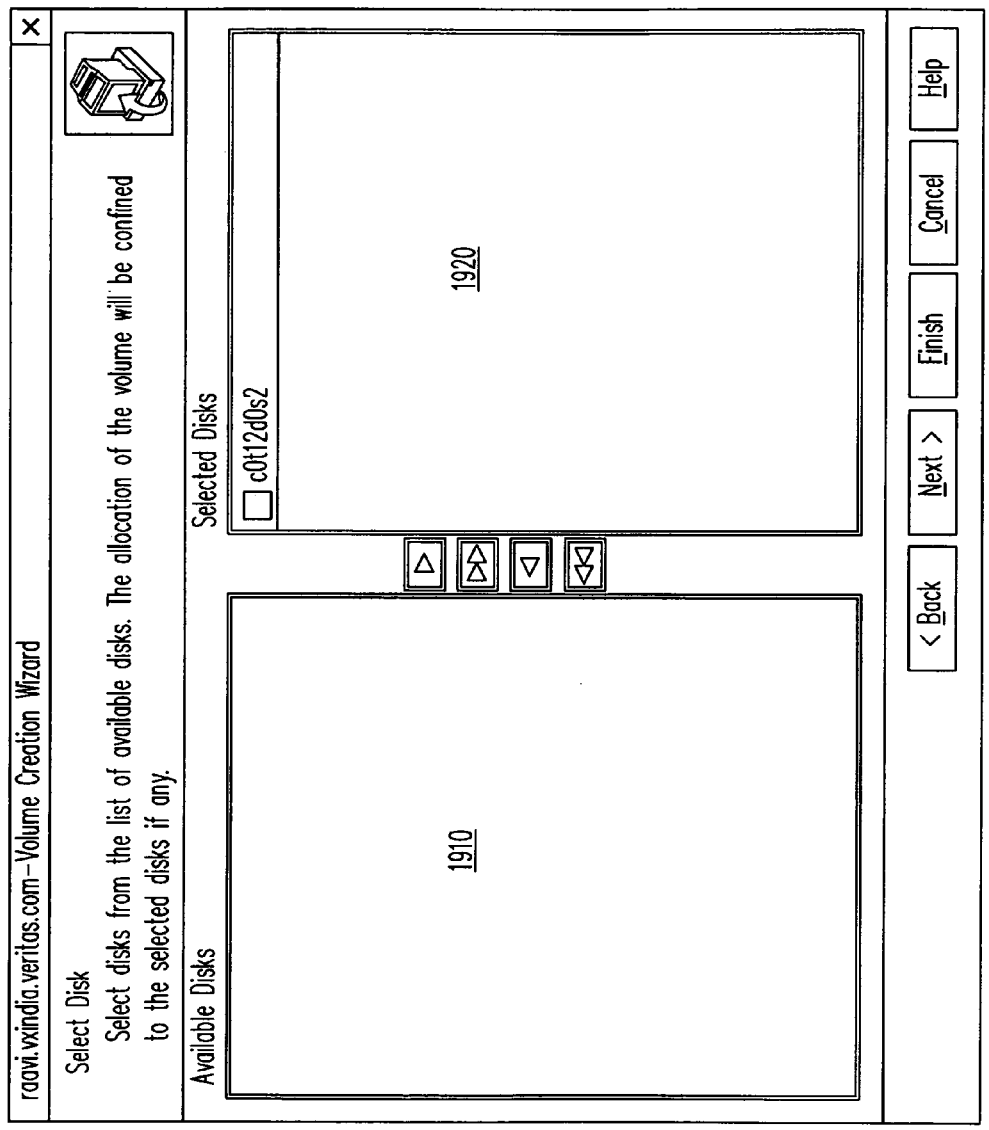

FIG. 19 is an example of a disk selection window for selecting a particular hardware disk to provide storage for a logical volume. Pane 1910 shows a list of available disks from which the user may select, and pane 1920 shows a list of disks already selected by the user. In this example, the user has already selected to use disk c0t12d0s2 for the logical volume to be created, and no other disks are available.

Figure 20:
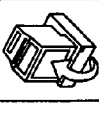

FIG. 20 is a summary page summarizing the user's functional description of a logical volume to be created. Summary information 2010 includes information specified by the user, including name of the logical volume, size of the logical volume, and disk group used to configure the logical volume. Selected capabilities 2020 includes capabilities selected by the user (none in this example). Selected rules 2030 includes a list of rules selected by the user (selected by virtue of the user's specification of the name of a disk to be used). Selected disks 2040 includes a list of disks selected by the user. Window 2050 indicates that the user's selected settings have been saved in a user template called template1.

The foregoing FIGS. 12 through 20 enable the user to specify requested characteristics, select capabilities, specify a user template to be used, or select a rule to configure a logical volume. The following sections describe a language that is used to specify rules and templates that are used to implement capabilities. Discussion of rules and templates is followed by a further discussion of capabilities and user templates.

Rules

Rules are the lowest level of the allocation specification language and are used to specify how a volume is to be created. One or more rules can be used to implement a capability. Two examples of types of rules are storage selection rules and storage layout rules. Storage selection rules select physical devices that can be used to implement a logical volume, and storage layout rules determine the layout of physical devices to implement the logical volume.

A rule can include one or more clauses, with each clause having a keyword. Each keyword is typically specified along with one or more attributes and/or attribute values, where each attribute corresponds to an attribute of a storage device and each attribute value corresponds to the value of the attribute of the storage device.

When more than one attribute/value pair is specified in a clause, an operator can be used to indicate the relationship between the attribute/value pairs that must be met for the clause to be satisfied. For example, an anyof( ) operator can be used to indicate that if any one of the attribute/value pairs is satisfied, the clause is satisfied; in effect, the anyof( ) operator performs an OR operation of the attribute/value pairs. An eachof( ) operator can be used to indicate that all of the attribute/value pairs must be met for the clause to be satisfied; in effect, the eachof( ) operator performs an AND operation of the attribute/value pairs. Other examples of operators include a oneof( ) operator and a noneof( ) operator.

A set of rules specifying user requirements for a logical volume can result in the need to "merge" the rules specified. For example, a set of rules implementing one capability may specify two mirrors, and another set of rules implementing another capability may specify two mirrors also. Rather than use four mirrors to implement the logical volume, a determination can be made whether only two mirrors can provide both capabilities. If so, only two mirrors can be included as part of the logical volume configuration.

Detailed syntax for rules according to one embodiment of the invention is provided in Appendix A.

Storage Selection Rules

Examples of keywords that are used in storage selection rules include select, confineto, exclude, separateby, strong separateby, multipath, and affinity.

The select keyword is used to select storage devices for creation of a virtual object such as a volume, mirror, or column. In one embodiment, the select keyword can be used to specify a set of logical unit numbers (LUNs) for storage devices that can be used to implement the virtual object.

An example of a clause including the select keyword is provided below:

select "Room"="Room1", "Room"="Room 2"

This select clause will select storage devices having a value of "Room1" or "Room2" for the attribute "Room" to implement the virtual object. The default operator anyof( ) is used for the select keyword, although eachof( ), noneof( ), and oneof( ) operators can also be specified.

The confineto keyword restricts physical devices that can be used to implement a particular virtual object, such as a volume or mirror. An example of a clause including the confineto keyword is provided below:

confineto eachof ("Vendor"="XYZ",
        "Room"="Room1")

This rule limits the storage devices that can be used to implement the virtual object of interest to storage devices having a value of XYZ for the Vendor attribute and a value of Room1 for the Room attribute. To be selected using the eachof( ) operator, a storage device must have the specified value for each of the attributes Vendor and Room.

The exclude keyword is used to exclude a set of storage devices, identified by LUNs, from being used to implement a virtual object. The separateby keyword is used to describe separation between virtual objects and is typically used to avoid a single point of failure for greater reliability. For example, a separateby "Controller" clause can be used to specify that virtual objects, such as mirrors of a volume, should not share a controller.

The strong separateby keyword disallows sharing of attribute values between virtual objects. For example, a 'strong separateby "Spindles" places virtual objects, such as mirrors of a volume, on independent sets of spindles. In contrast, the affinity keyword expresses attraction between virtual objects such that virtual objects share as many attribute values as possible. For example, an 'affinity "Enclosure"' clause results in virtual objects, such as mirrors, using as few enclosures as possible.

The multipath keyword specifies tolerance of the virtual object to the failure of a specified number of one or more specified components. For example, a 'multipath 2 "Controller", 2 "Switch"' clause indicates that the virtual object should tolerate the failure of one path through a controller and a switch.

Storage Layout Rules

Examples of storage layout keywords include redundancy, parity, stripe, mirror, build mirror, and mirror group keywords. The redundancy keyword can be used both at the rule level and within a sub-clause. When used as a rule, the redundancy keyword describes the effective fault tolerance of the volume in terms of device failures. For a software-mirrored volume, redundancy indicates the number of mirrors the volume is expected to have. For a hardware-mirrored volume, redundancy indicates the number of underlying storage devices (LUNs) that should exist.

When used in a sub-clause, the redundancy keyword can be used, for example, to specify different types of separation within a virtual object. Consider the following sub-clause:

mirror 4
      redundancy 3 {separateby enclosure }
      redundancy 2 {separateby controller }

This example describes a logical volume including four mirrors. This logical volume can tolerate the failure of two enclosures and one controller. Two mirrors can be within the same enclosure, and each of the other two mirrors can be on different enclosures. Any three of the four mirrors can be connected through the same controller and the fourth mirror connected through a different controller.

The parity keyword enables the user to specify whether a capability such as redundancy is parity-based and, in one embodiment, has associated values of true, false, and don't care. Parity-based redundancy is implemented using a RAID-5 layout. Parity can be implemented in hardware or software.

Keywords and keyword phrases including mirror, build mirror, mirror group, stripe, and redundancy are used in sub-clauses to, for example, more specifically configure one or more mirrors or columns of a volume. The mirror keyword is used to describe one or more mirrors of a logical volume. Rules specified within a mirror sub-clause apply to the corresponding mirror virtual object.

The stripe keyword indicates whether the virtual object of interest is to be striped and has associated values of true and false. Striping can also be implemented in hardware or software.

A mirror group sub-clause is used to group mirrors in a volume. Mirrors can be grouped when the mirrors share common attributes or when different groups of mirrors should be separated. Merging of rules involving mirrors typically occurs within a mirror group. A build mirror sub-clause forces a mirror to be created; these mirrors are not subject to merging.

Templates

A template is a meaningful collection of rules. Volumes can be created specifying templates instead of specifying individual rules. The rules in a template specify one or more capabilities, or features, of a logical volume. For example, a template can have rules such that the logical volume created using those rules tolerates failures of M controllers and has N copies of data. In this example, the user can enter the values of M and N, thus allowing end-user customization of specifications. A logical volume is configured to meet the user requirements to tolerate failure of M controllers and retain N copies of data. A user can name templates to be used for the creation of logical volumes, or the user can specify rules.

A template may provide a given capability by including rules providing the given capability, or by "requiring" a capability. When a template requires a capability but does not include rules providing the capability, the template obtains the rules needed to provide the required capability from another template that does include the rules providing the required capability. The requires keyword enables any template that provides the given capability to be used, therefore allowing flexibility in implementation of capabilities. A template that requires a given capability and provides the given capability by virtue of requiring the given capability, without specifying which template from which the rules are to be obtained, is said to indirectly "inherit" the capability. A template that requires a given capability and provides the given capability by virtue of requiring the given capability and specifying which template from which the rules are to be obtained is said to directly "inherit" the capability. Indirect inheritance is more flexible than direct inheritance, because indirect inheritance enables the best template for providing the template to be selected.

A given template can "extend" one or more other templates. When a template B extends a template A, B provides all capabilities that A provides, B requires all capabilities that A requires, B inherits all capabilities that A provides, and B has access to all the rules of A. The derived template (B in this example) has an "is a" relationship with the base template (A in this example). A derived template can be used wherever the corresponding base template can be used.

In one embodiment of the invention, preferably a template providing only the desired capability is selected to provide the desired capability. By following this preference, unrelated capabilities are not given to a volume and the intent of the person making the original allocation is more easily preserved. If several capabilities are desired, a template providing more than one of the desired capabilities is preferable to a template providing only one of the desired capabilities.

In one embodiment, the user can specify capabilities for a logical volume, instead of providing a name of one or more templates that create the volume with the desired capability. For example, a user can specify Reliable, High-Performance, Snapshot-capable, or other capabilities. Capabilities can have parameters for which the user may enter values, thereby allowing end-user customization of templates, as described above.

Capabilities

Since a template provides one or more capabilities, suitable templates can be selected by the system, depending on the capabilities requested by the user, allowing flexibility in implementing a given capability.

In the allocation language, a capability is defined by providing a name describing the capability provided, a description, a list of capabilities that the given capability extends, and a variable list. In this embodiment, the name of the capability can be a string having any value descriptive of the capability, such as "Reliable".

In one embodiment, a capability being defined can be derived from another capability, thereby extending the base capability. An extends keyword can be used to indicate that a given capability extends from a base capability for which the capability name is given. A derived capability inherits variables from its base capabilities, and thus preferably does not have variables with the same name as the variables for the base capability. If a capability inherits from multiple base capabilities, variable names of the base capabilities are preferably different.

In defining a capability, a list of variables can be provided in a "variables block," beginning with a var keyword. Values for these variables are provided by the user when a capability is requested. In one embodiment, each variable has a name, a type, a default value, and a description. An example of several capability definitions is provided below:

```
capability Reliable {
    description "Provides Reliable Storage"
    descriptionID {26C0647D-182E-47f2-8FB6-2B3D0F62E961}, 1
    var NMIR:int {
        defaultvalue 2
        description "Number of software mirrors"
        descriptionID {26C0647D-182E-47f2-8FB6-2B3D0F62E961}, 2
    }
};
capability HardwareVendorReliable {
    description "Provides Hardware Reliable Storage"
    descriptionID {26C0647D-182E-47f2-8FB6-2B3D0F62E961}, 2
    extends Reliable
```

-continued

```
    var VENDOR: string {
        defaultvalue "ABC"
        description "Vendor Name"
        descriptionID {26C0647D-182E-47f2-8FB6-2B3D0F62E961}, 2
}
```

The HardwareVendorReliable capability extends the Reliable capability by specifying a particular value for the hardware's Vendor attribute. Any storage device provided by Vendor "ABC" can be considered to inherently include the Reliable capability.

User Templates

A user template is a higher abstraction over capabilities, further simplifying specification of logical volume characteristics. A storage administrator can group capabilities based upon the way a particular application uses a volume having those capabilities is used. For example, an administrator can provide a user template specifically configured for a particular application or intended use.

By indicating an intended use of the logical volume, the user provides an "intermediate description of intent" for the logical volume. This intermediate description of intent is used to determine an intent of the volume creator to be stored with the logical volume, where the stored intent includes further information about how the logical volume was implemented. For example, the stored intent may include rules, capabilities, and variable values used to configure the logical volume.

For this reason, the term 'application-specific template' is used interchangeably with the term 'user template' herein. For example, a volume intended for storing a database table may have capabilities Reliable, with a certain number of data copies, and High Performance, where the database is confined to storage on a certain type of high performance storage device. This set of capabilities, along with the rules, can be saved as a user template called Database_Table. A user template is thus a collection of capabilities (with or without parameter values specified), templates, and rules. For example, the user template Database_Table can have capabilities, such as Reliable (NDISKS=2) and High Performance (NCOLS=15), as well as rules, such as 'confine to "Vendor"="XYZ."' A user can specify that the storage to be allocated is intended for use as, for example, database table storage. The intended use can be associated with an appropriate application-specific template, or the name of the user template can be specified by the user. The user does not need to specify rules, templates, capabilities, or variable values, and a logical volume will be created according to the user template specified.

The user can use various types of specifications, from low-level specifications using rules to high-level specifications including user templates. Also, the user can specify micro-level characteristics, such as particular storage devices where each part of the logical volume should be stored, or macro-level specifications, where the user specifies only a desired characteristic or intended use of the logical volume, allowing the system to decide the best layout for the logical volume. User templates are the easiest to use, but give the user less control over volume creation. Rules are more difficult to use, but give the user complete control over volume creation. Once the user requirements are obtained, available storage information is obtained and compared to the user requirements.

Obtaining Available Storage Information

Available storage includes both physical storage devices accessible to the host and logical volumes that have already been allocated. Physical devices not used in a logical volume are identified by Logical Unit Numbers (LUNs), and logical volumes are identified by a volume name given to the logical volume upon creation. The present invention provides available storage information for logical volumes in the same way as for LUNs, such that a logical volume is indistinguishable from a LUN when viewed from the perspective of the functional requirements, or capabilities, the storage provides. Physical devices and logical volumes are collectively referred to herein as storage devices.

Storage devices have attributes such as Unique Identifier, Size, Available Size, Controller, Enclosure, Vendor, Model, Serial Number, Columns, Mirrors, and so on. In addition to these attributes, storage devices can optionally have capabilities, such as Reliability. The present invention allows capabilities to be specified not only for logical volumes, but also for physical storage devices. For example, a Striping capability can be associated with a hardware device that is striped. A logical volume can include hardware devices providing certain capabilities and virtual objects providing other capabilities.

When a user requests storage having certain capabilities, the present invention determines whether those capabilities exist on the available storage devices. If a particular storage device has Striping capability, whether in hardware or configured using software, that particular storage device can be used to fulfill a user requirement, such as High Performance, that can be implemented using striping. If the amount of available storage on the storage device is insufficient to meet the user's functional requirements, multiple storage devices having the required capability can be used.

Produce Logical Volume Configuration To Meet User Requirements Using Storage Information The allocation engine of the present invention, such as allocation engine 1030 of FIGS. 10 and 11, takes as input the allocation request, in the form of user requirements. The allocation engine also uses a configuration database, such as configuration database 1004, which includes rules, templates, and capabilities. The allocation engine obtains available storage information for the network environment and selects the appropriate storage to meet the rules defined in the templates that satisfy the user's functional requirements. The allocation engine arranges the selected storage in a logical volume configuration. The arrangements are hierarchical in nature with virtual objects, such as volumes, mirrors, and columns, forming the nodes of the hierarchy. Types of virtual objects can include volumes, mirrors, columns, volume groups, mirror groups, and groups. In one embodiment, virtual objects also include co-volumes, unnamed groups, and groups of groups.

Figure 21:
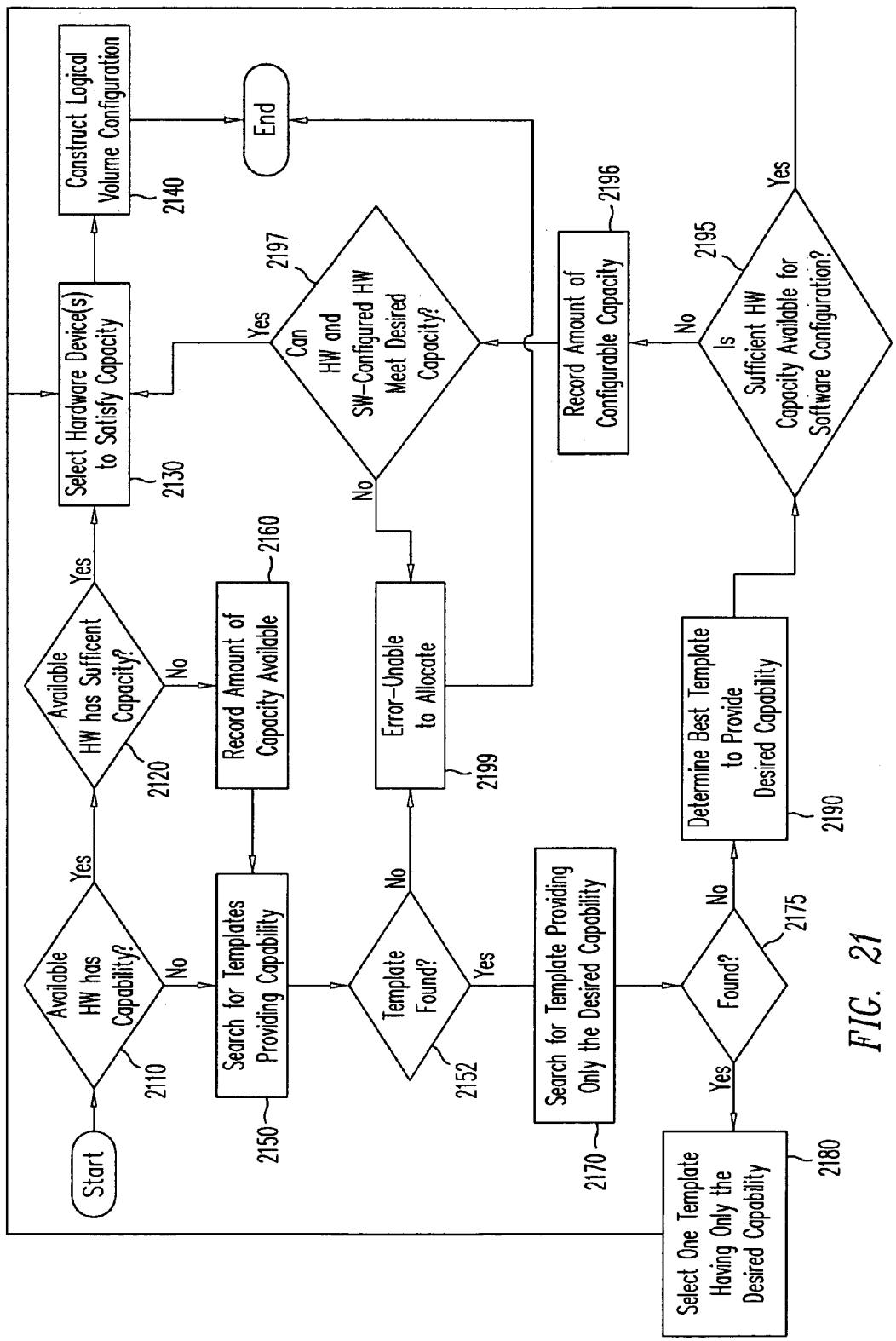
FIG. 21 is a flowchart showing the determination of a logical volume configuration to best satisfy a capability requested by a user.

FIG. 21 shows a flowchart illustrating the determination of a logical volume configuration to best satisfy a capability requested by a user. While a user can select multiple capabilities, the flowchart of FIG. 21 shows the process for user requirements for one capability and a given capacity. The configuration of logical volumes with more than one capability is described following the discussion of FIG. 21.

In FIG. 21, at "Available Hardware (HW) has Capability" decision point 2110, a determination is made whether one or more hardware devices can provide the requested capability. If so, control proceeds to "Available Hardware has Sufficient Capacity" decision point 2120 to determine whether any of the hardware devices identified in the previous step have sufficient capacity to provide the size of the logical volume requested by the user. If so, control then proceeds to "Select Hardware Device(s) to Satisfy Capacity" step 2130 to select from the hardware devices having both the capability and the capacity requested. A set of one or more hardware devices can be selected. The term 'set,' as used herein with respect to storage devices, refers to a set including one or more storage devices. Control then proceeds to "Construct Logical Volume Configuration" step 2140, where a logical volume configuration is constructed to provide the requested capabilities of the logical volume using the selected hardware.

At "Available Hardware has Sufficient Capacity" decision point 2120, if no hardware device with the capability has sufficient capacity to satisfy the user's functional requirement, control proceeds to "Record Amount of Hardware Capacity Available" step 2160. In "Record Amount of Hardware Capacity Available" step 2160, the capacity available for each hardware device having the capability is recorded for future reference. This capacity information may be used if the requested capability and capacity can only be provided by using a combination of existing hardware having the capability and software-configured hardware. Control then proceeds to "Search for Template Providing Capability" step 2150.

At "Available Hardware has Capability" decision point 2110, if none of the hardware devices can provide the requested capability, control proceeds to "Search for Templates Providing Capability" step 2150. A configuration database, such as configuration database 1004 of FIG. 10, is searched for templates that provide the requested capability. Control proceeds to "Template Found" decision point 2152. If no template is found, control proceeds to "Error—Unable to Allocate" step 2199, and an error message is returned to the user indicating that sufficient resources are unavailable to configure the requested logical volume. If a template is found at "Template Found" decision point 2152, control proceeds to "Search for Template Providing Only the Desired Capability" step 2170. In "Search for Template Providing Only the Desired Capability" step 2170, a search is made for a template providing only the desired capability to avoid providing unnecessary capabilities. Control proceeds to "Found" decision point 2175. If one or more templates is found having only the desired capability, control proceeds to "Select One Template Having Only the Desired Capability" step 2180. Control then proceeds to "Select Hardware Device(s) to Satisfy Capacity" step 2130 and then to "Construct Logical Volume Configuration" step 2140, where the logical volume configuration is constructed using the selected hardware.

If at "Found" decision point 2175, no template is found having only the desired capability, control proceeds to "Determine Best Template to Provide Desired Capability" step 2190. In "Determine Best Template to Provide Desired Capability" step 2190, a template is selected having as few capabilities as possible in addition to the desired capability. Control then proceeds to "Is Sufficient Hardware Capacity Available for Software Configuration" decision point 2195. Preferably, in making this determination, hardware that already has the capability built in is excluded. If sufficient hardware capacity is available, control proceeds to "Select Hardware Device(s) to Satisfy Capacity" step 2130 and then to "Construct Logical Volume Configuration" step 2140, where the logical volume configuration is constructed using the selected hardware.

If at "Is Sufficient Hardware Capacity Available for Software Configuration" decision point 2195, insufficient hardware capacity is available for software configuration, control proceeds to "Record Amount of Configurable Capacity" step 2196 to record the amount of hardware capacity that can be configured by software to have the desired capability. Control then proceeds to "Can Hardware and Software-Configured Hardware Together Meet Desired Capacity" decision point 2197. The hardware capacity information recorded at "Record Amount of Hardware Capacity Available" step 2160 is used in conjunction with capacity information determined at "Record Amount of Configurable Capacity" step 2196 to make this decision.

If hardware and software-configured hardware can be combined to meet the desired capacity, control proceeds to "Select Hardware Device(s) to Satisfy Capacity" step 2130 and then to "Construct Logical Volume Configuration" step 2140, where the logical volume configuration is constructed using the selected hardware. If hardware and software-configured hardware cannot be combined to meet the desired capacity, control proceeds to "Error—Unable to Allocate" step 2199, and an error message is returned to the user indicating that sufficient resources are unavailable to configure the requested logical volume.

As described above, a user can select more than one capability for a logical volume. With user requirements combining capabilities, the steps illustrated in FIG. 21 describe the relevant method of determining the logical volume configuration, but each individual step becomes more complicated. For example, a given hardware device may provide some, but not all, of the requested capabilities and/or capacity. In addition, a given template or set of templates may provide different combinations of capabilities that work better in some environments than in others. Rules and/or user-configurable variables can be provided to select appropriate combinations of hardware and software configurations to best meet the user's functional requirements.

Consider an example wherein a configuration database, such as configuration database 1004, includes the following templates (designated by the variable t) and capabilities (designated by the variable c):

t1: c1
t2: c2
t3: c3
t4: c1, c2, c5
t5: c2, c3, c6
t6: c1, c3

Also consider that the user has requested a volume having capabilities c1, c2 and c3. The allocation engine, such as allocation engine can determine that the most preferable template combination to provide these requested capabilities is the combination of templates t2 and t6, and that the second-best template combination is the combination of templates t1, t2, and t3. Note that templates t4 and t5 introduce capabilities not requested for the logical volume, respectively, capabilities c5 and c6. To preserve the intent of the original requester as closely as possible, templates t4 and t5 should be avoided if possible.

As described above, allocating storage for a logical volume requires a careful balance of the capabilities requested, the performance of the devices configured to provide the capability, reliability of the configurations, and cost. These considerations are taken into account by the allocation engine and are discussed in further detail below.

Storage Selection Considerations

Each of the different types of storage configurations described above has different strengths and weaknesses. The allocation engine of the present invention balances these factors when selecting storage to be used to meet the user's functional requirements for a logical volume.

Concatenated Storage

Concatenated storage bandwidth and I/O rate may attain maximum values that equal the sum of the values of the disks that make up the plex. Notice that this summation is over disks and not subdisks because bandwidth is determined by physical data transfer rate of a hard disk, and so is I/O rate. Therefore, concatenating subdisks belonging to the same hard disk in a plex does not increase plex bandwidth.

Bandwidth is sensitive to access patterns. Realized bandwidth may be less than the maximum value if hot spots develop. Hot spots are disks that are accessed more frequently compared to an even distribution of accesses over all available disks. Concatenated storage is likely to develop hot spots. For example, take a volume that contains a four-way concatenated plex. Suppose further that the volume is occupied by a dozen database tables. Each table, laid out on contiguous blocks, is likely to be mapped over one subdisk. If a single database table is accessed very heavily (though uniformly), these access will go to one subdisk rather than being spread out over all subdisks.

Concatenated storage created from n similar disks has approximately n times poorer net reliability than a single disk. If each disk has a Mean Time Between Failure (MTBF) of 100,000 hours, a ten-way concatenated plex has only one-tenth the MTBF, or 10,000 hours.

Striped Storage

Like concatenated storage, striped storage has capacity, maximum bandwidth, and maximum I/O rate that is the sum of the corresponding values of its constituent disks (not subdisks). Moreover, just like concatenated storage, striped storage reliability is n times less than one disk when there are n disks. However, since striping distributes the blocks more finely over all subdisks—in chunks of stripe units rather than chunks equal to a full subdisk size—hot spots are less likely to develop. For example, if a volume using four subdisks is occupied by a dozen database tables, the stripe size will be much smaller than a table. A heavily (but uniformly) accessed table will result in all subdisks being accessed evenly, so no hotspot will develop.

A small stripe unit size helps to distribute accesses more evenly over all subdisks. Small stripe sizes have a possible drawback, however; disk bandwidth decreases for small I/O sizes. This limitation can be overcome in some cases by volume managers that support "scatter-gather I/O." An I/O request that covers several stripes would normally be broken up into multiple requests, one request per stripe unit. With scatter-gather I/O, all requests to one subdisk can be combined into a single contiguous I/O to the subdisk, although the data is placed in several non-contiguous regions in memory. Data being written to disk is gathered from regions of memory, while data being read from disk is scattered to regions of memory.

Optimum stripe unit size must be determined on a case-by-case basis, taking into account access patterns presented by the applications that will use striped storage. On the one hand, too small a stripe unit size will cause small sized disk I/O, decreasing performance. On the other hand, too large a stripe unit size may cause uneven distribution of I/O, thereby not being able to use full bandwidth of all the disks.

Mirrored Storage

Bandwidth and I/O rate of mirrored storage depend on the direction of data flow. Performance for mirrored storage read operations is additive—mirrored storage that uses n plexes will give n times the bandwidth and I/O rate of a single plex for read requests. However, the performance for write requests does not scale with number of plexes. Write bandwidth and I/O rate is a bit less than that of a single plex. Each logical write must be translated to n physical writes to each of the n mirrors. All n writes can be issued concurrently, and all will finish in about the same time. However, since each request is not likely to finish at exactly the same time (because each disk does not receive identical I/O requests—each disk gets a different set of read requests), one logical write will take somewhat longer than a physical write. Therefore, average write performance is somewhat less than that of a single subdisk. If write requests cannot be issued in parallel, but happen one after the other, write performance will be n times worse than that of a single mirror.

Read performance does improve with an increasing number of mirrors because a read I/O need be issued only to a single plex, since each plex stores the same data.

Mirrored storage is less useful in terms of capacity or performance. Its forte is increased reliability, whereas striped or concatenated storage gives decreased reliability. Mirrored storage gives improved reliability because it uses storage redundancy. Since there are one or more duplicate copies of every block of data, a single disk failure will still keep data available.

Mirrored data will become unavailable only when all mirrors fail. The chance of even two disks failing at about the same time is extremely small provided enough care is taken to ensure that disks will fail in an independent fashion (for example, do not put both mirrored disks on a single fallible power supply).

In case a disk fails, the disk can be hot-swapped (manually replaced on-line with a new working disk). Alternatively, a hot standby disk can be deployed. A hot standby disk (also called hot spare) is placed in a spare slot in the disk array but is not activated until needed. In either case, all data blocks must be copied from the surviving mirror on to the new disk in a mirror rebuild operation.

Mirrored storage is vulnerable to a second disk failure before the mirror rebuild finishes. Disk replacement must be performed manually by a system administrator, while a hot standby disk can be automatically brought into use by the volume manager. Once a replacement is allocated, the volume manager can execute a mirror rebuild. The volume, though it remains available, runs slower when the mirror is being rebuilt in the background.

Mirrors are also vulnerable to a host computer crash while a logical write to a mirror is in progress. One logical write request results in multiple physical write requests, one for each mirror. If some, but not all, physical writes finish, the mirrors become inconsistent in the region that was being written. Additional techniques must be used to make the multiple physical writes atomic.

RAID-3 and RAID-5 Storage

RAID-3 storage capacity equals n−1 subdisks, since one subdisk capacity is used for storing parity data. RAID-3 storage works well for read requests. Bandwidth and I/O rate of an n-way RAID-3 storage is equivalent to (n−1)-way striped storage. Write request behavior is more complicated. The minimum unit of I/O for RAID-3 is equal to one stripe. If a write request spans one stripe exactly, performance is least impacted. The only overhead is computing contents of one parity block and writing it, thus n I/Os are required instead of n−1 I/Os for an equivalent (n−1)-way striped storage. A small write request must be handled as a read-modify-write sequence for the whole stripe, requiring 2n input/output operations.

RAID-3 storage provides protection against one disk failure. As in mirrored storage, a new disk must be brought in and its data rebuilt. However, rebuilding data is costlier than for mirrors because it requires reading all n−1 surviving disks.

RAID-5 storage capacity equals n−1 subdisks, since one subdisk capacity is used up for storing parity data. RAID-5 storage works well for read requests. Bandwidth and I/O rate of an n-way RAID-5 storage is equivalent to n-way striped storage. The multiplication factor is n—rather than n−1 as in the case of RAID-3—because the parity blocks are distributed over all disks. Therefore, all n disks contain useful data as well, and all can be used to contribute to total performance. RAID-5 works the same as RAID-3 when write requests span one or more full stripes. For small write requests, however, RAID-5 uses four disk I/Os:

Read1 old data
Read2 parity
Compute new parity=XOR sum of old data, old parity, and new data
Write3 new data
Write4 new parity Latency doubles since the reads can be done in parallel, but the writes can be started only after the read requests finish and parity is computed. Note that the two writes must be performed atomically. Therefore, I/O requests to a single stripe are serialized even though they are to non-overlapping regions. The application will not ensure this, since it is required to serialize I/O only to overlapping regions. In addition, writes are logged in a transaction to make them atomic in case the server or storage devices fail.

RAID-5 storage provides protection against one disk failure. As with mirrored storage, a new disk must be brought in and its data rebuilt. As with RAID-3 storage, all n−1 surviving disks must be read completely to rebuild the new disk.

Due to the overhead involved with RAID, RAID storage is best implemented in intelligent disk arrays that can use special parity computation hardware and non-volatile caches to hide RAID write latencies from the host computer. As is the case with mirrored storage, RAID storage is also vulnerable with respect to host computer crashes while write requests are being made to disks. A single logical request can result in two to n physical write requests; parity is always updated. If some writes succeed and some do not, the stripe becomes inconsistent. Additional techniques can be used to make these physical write requests atomic.

After taking into account all of these storage selection criteria, the allocation engine of the present invention arranges the storage objects selected into a logical volume configuration. As described above, the logical volume configuration constructed is provided in the form of a virtual object hierarchy to a command processor, such as command processor 1030. The command processor then determines commands that will configure the physical storage devices to form the logical volume. A more detailed explanation of logical volume configurations follows the discussion below of the last step of the flowchart of FIG. 8.

Execute Commands to Implement Logical Volume Configuration in Hardware and/or Software A command processor, such as command processor 1040, takes a logical volume configuration in the form of a virtual object hierarchy as input and uses appropriate commands to create the volume. These commands are dependent upon the particular operating environment and storage devices in use. These commands are often provided by various interfaces to the storage devices.

Examples of commands used to implement a logical volume in one embodiment of the invention are given below. For example, the following commands create subdisks to store the logical volume.

sd1=CreateSubdisk(name, disk, offset_on_disk, length, flags)
sd2= . . .
sd3= . . .
sd4= . . .

The following commands create plexes within the logical volume:
pl1=CreatePlex(name, flags)
pl2= . . .

The following commands associate the subdisks with the plexes:
AssociateSubdiskWithPlex(pl1, sd1)
AssociateSubdiskWithPlex(pl1, sd2)
AssociateSubdiskWithPlex(pl2, sd3)
AssociateSubdiskWithPlex(pl2, sd4)

The logical volume is then created using the following command:
vol1=CreateVolume(name, flags, . . . )

The plexes are then associated with the volume:
AssociatePlexWithVolume(vol1, pl1)
AssociatePlexWithVolume(vol1, pl2)

Making the above application programming interface calls creates a logical volume. As mentioned previously, the rules, templates and capabilities are stored along with the volume as intent of allocation. Administrative operations on the volume (data relocation, disk evacuation, increase or decrease the size of the volume, and so on) can preserve this intent by ensuring that, when the logical volume is reconfigured, the rules, templates, and capabilities are used to reconfigure the logical volume so that the logical volume continues to conform to the intent of allocation.

Example Allocation of Storage

Assume that a user wishes to allocate a 10 GB volume named "vol1" that is reliable and provides high performance. Also assume that a configuration database of rules, templates, and capabilities, such as configuration database 1004 of FIGS. 10 and 11, includes the following:

```
capability DiskReliability {
  var NDISKS: int {
    description "Survive failure of NDISKS-1 disks"
    defaultvalue 2
  }
};
volume_template DiskReliabilityThroughMirroring {
  provides DiskReliability
  rules {
    mirror NDISKS
  }
};
capability PathReliability {
  var NPATHS: int {
    description "Survive failure of NPATHS-1 paths"
    defaultvalue 3
  }
};
volume_template PathReliabilityThroughMirroring {
  provides PathReliability
  rules {
    mirror NPATHS2 {
```

-continued

```
      separateby "Controller"
    }
  }
};
volume_template PathReliabilityThroughMultipathing {
  provides PathReliability
  rules {
    multipath NPATHS "Controller"
  }
};
capability HighPerformance {
  var NCOLS: int {
    description "Disperse the data across NCOLS disks"
    defaultvalue 15
  }
};
volume_template HighPerformanceThroughStriping {
  provides HighPerformance
  rules {
    stripe NCOLS
  }
};
```

In the above entries in the configuration database, configuring a reliable logical volume can be accomplished in two ways. The PathReliability capability is defined as being able to tolerate faults on the path from the host to storage. The amount of tolerance can be specified by the user (through the use of the NPATHS variable in the PathReliability capability). Each of the PathReliabilityThroughMirroring and the PathReliabilityThroughMultipathing templates provides a different way to implement a path-reliable logical volume. The PathReliabilityThroughMultipathing template implements path reliability as a volume constructed from hardware having the specified number of paths (specified using the NPATHS variable) to a storage device. The PathReliabilityThroughMirroring template implements path reliability by storing copies of data on disks on paths for different controllers, so that if one path fails, a mirrored copy of the data is available via another path for a different controller.

The DiskReliabilityThroughMirroring template tolerates disk failure by using two or more data mirrors (with a default value of two). Mirrors are stored on different disks, so that if the disk for one mirror fails, a second copy of the data is available on another disk.

The "High Performance" capability requested by the user for volume "vol1" can be provided by the HighPerformanceThroughStriping template. One of skill in the art will recognize that other ways to achieve high performance are possible, and that the HWighPerformanceThroughStriping template is an example only. When requesting the Performance capability, the user can specify, for example, whether a High or Medium level of performance is desired, as previously shown in FIG. 15. The HighPerformanceThroughStriping provides a default value of fifteen (15) disks (referred to as the number of columns, NCOLS) over which the data are dispersed. In one embodiment, a user may specify a number of columns other than the default value.

Figure 22:
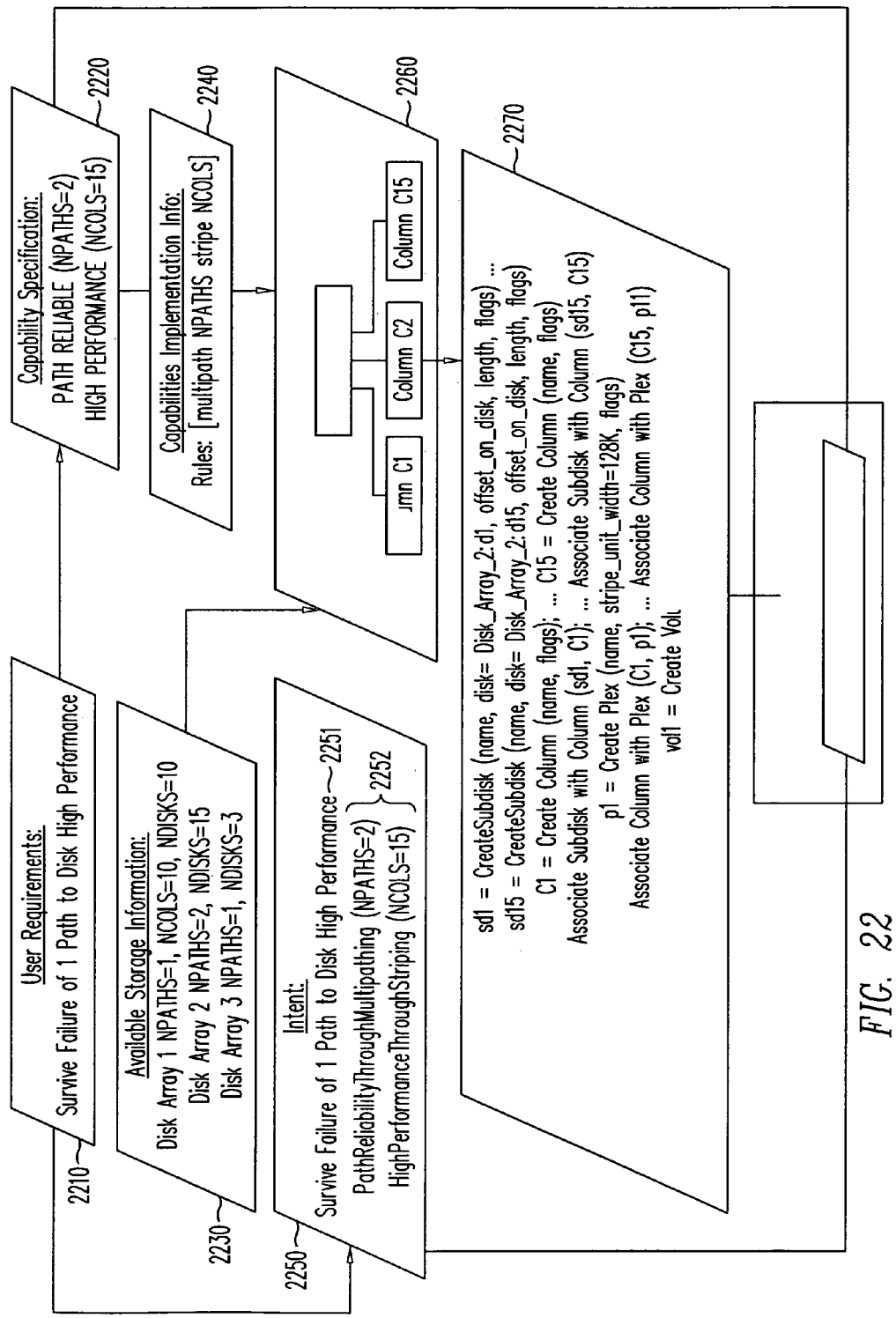
FIG. 22 shows an example of user requirements, a capability specification, a logical volume configuration, intent, and commands to configure the logical volume in accordance with one embodiment of the present invention.

FIG. 22 shows an example of user requirements 2210, a capability specification 2220, a logical volume configuration 2260, intent 2250, and commands 2270 to configure a logical volume 2282 in accordance with one embodiment of the present invention. Assume that the user has specified that the storage allocated must be capable of surviving the failure of one path to a storage device and meeting high performance standards.

From user requirements 2210, capability specification 2220 is produced specifying that the storage allocated must provide path reliability and meet high performance standards. In the embodiment shown available storage information 2230 is examined, and rules to implement capability specification 2220 are selected and provided as capabilities implementation information 2240.

Available storage information 2230 indicates that the storage environment in which the logical volume is to be configured includes the following: A striped disk array, Disk Array 1, has ten columns (disks) across which data can be dispersed and one path to each disk; Disk Array 2 has two paths to each storage device and includes fifteen disks; and Disk Array 3 includes three disks with one path to each disk. To meet user requirements 2210, Disk Array 1 alone is not suitable for implementing the logical volume because the high performance criteria of 15 columns cannot be provided and the each disk is not accessible via multiple paths. Disk Array 2 provides the path reliability sought by including multiple paths and 15 disks available for striping, but Disk Array 2 is not pre-configured as striped. Disk Array 3 does not support multiple paths or stripes and includes 3 disks. The best choice for implementing the required logical volume is Disk Array 2, assuming that Disk Array 2 has the requested 10 GB of storage available. Striping can be added via a software configuration, whereas multiple paths are provided by the hardware of Disk Array 2.

In this example, the PathReliabilityThroughMultipathing template is used, resulting in a multipath rule and a stripe rule, as shown in capabilities implementation information 2240. Logical volume configuration 2260 is produced using the rules of capability implementation information 2240 and available storage information 2230.

When logical volume configuration 2260 is determined, the intent 2250 of the user is preserved, to be stored in physical storage device(s) 2280 along with the logical volume 2282 as part of "Data Stored with Logical Volume" 2284. Intent 2250 can include user requirements 2251 (taken from user requirements 2210) as well as rules and templates selected and variable values used 2252 to implement the logical volume 2284. Intent 2250 is preserved for reuse in the event that the logical volume's configuration is changed, for example, by adding additional storage devices, resizing the volume, or evacuating data from the volume. Rules stored within intent 2250 are used to reconfigure logical volume 2282 such that logical volume 2282 continues to conform to the rules. By consistently conforming to the rules, consistent performance and availability can be guaranteed, for example, to fulfill contractual availability requirements of storage service level agreements.

To implement the logical volume using Disk Array 2, a logical volume configuration, such as virtual object hierarchy 2260, is produced. Virtual object hierarchy 2260 includes a volume level and three columns (one for each stripe) and corresponds to commands that will be issued to configure the hardware selected, here Disk Array 2. Virtual object hierarchy 2260 does not include a representation of multiple paths, as multiple paths are provided by Disk Array 2 and are not configured by software.

Virtual object hierarchy 2260 is used to produce commands 2270 to configure a logical volume having the logical volume configuration 2260. These commands are executed to configure a logical volume from one or more physical storage devices. In this example, commands to create 15 subdisks are first issued, with each command indicating an identifier for a respective disk (d1 through d15) within Disk Array 2 to be used. The 15 columns are then created, and each subdisk is associated with a respective column.

A plex is then created using a stripe_unit_width of 128K bytes, such that data for each column is written to the plex in units of 128K bytes. Each of the 15 columns is associated with the plex because data from all 15 columns are needed to provide a complete copy of the data. A logical volume is created and the plex is associated with the logical volume.

The logical volume configuration 2260 and resulting logical volume 2282 created thus meets user requirements 2210. Logical volume 2282 survives failure of one path to disk because two different paths exist to each disk upon which a column is stored, by virtue of the multiple paths within Disk Array 2. Logical volume 2282 provides high performance because the input/output of the data is spread across 15 columns.

After the logical volume is created, intent 2250, capability specification 2220, and capabilities implementation information 2240 are stored along with logical volume 2282 as "Data Stored with Logical Volume" 2284.

Figure 23:
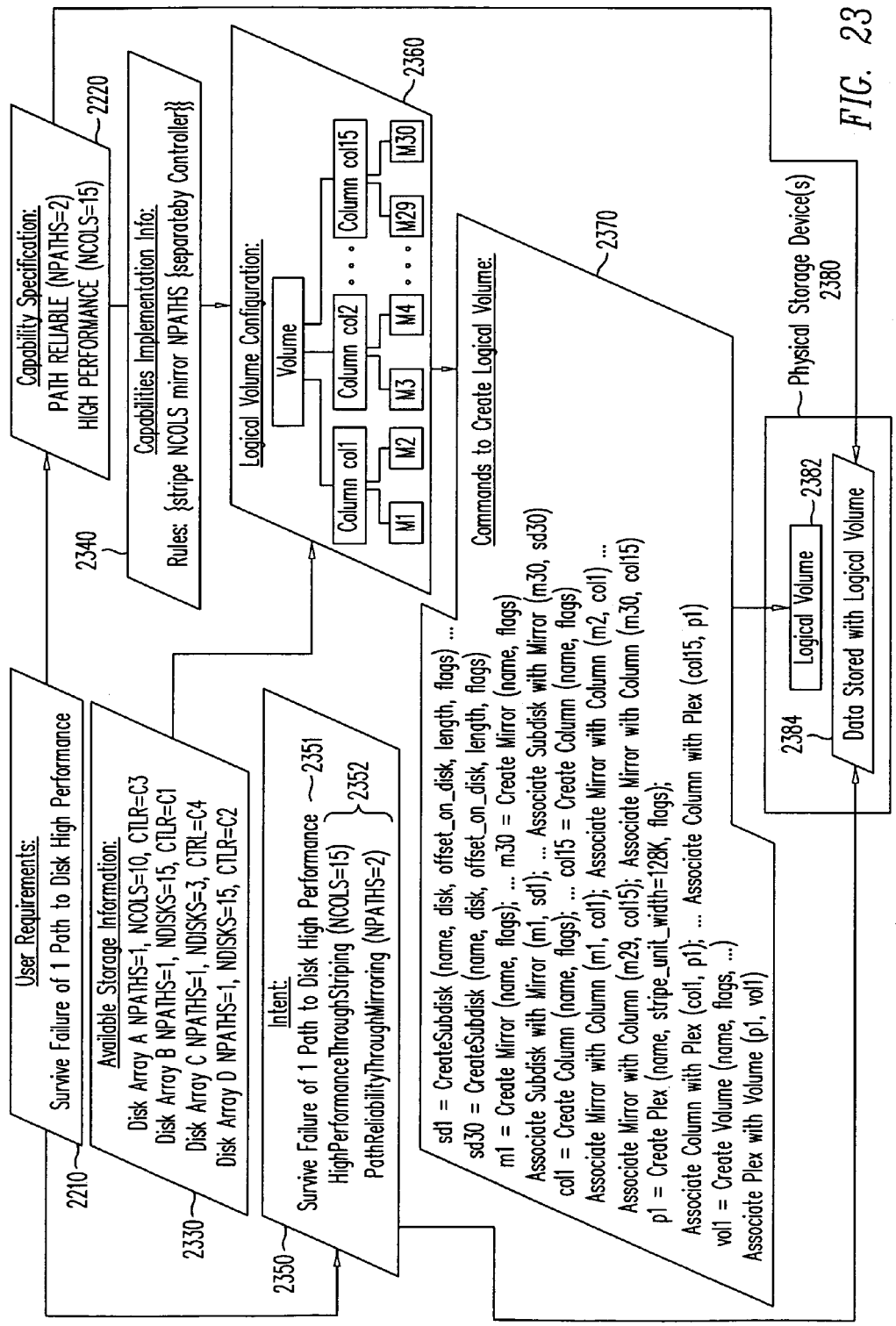
FIG. 23 shows another example of user requirements, a capability specification, a logical volume configuration, intent, and commands to configure the logical volume in accordance with one embodiment of the present invention.

FIG. 23 shows an example of user requirements 2210, a capability specification 2220, a logical volume configuration 2360, intent 2350, and commands 2370 to configure a logical volume 2382 in accordance with one embodiment of the present invention. Assume that the same user requirements 2210 are specified, producing the same capability specification 2220, but that the available storage information 2330 is different than the example shown in FIG. 22.

The rules of capability implementation information 2340 are selected by examining available storage information 2330. Available storage information 2330 differs from available storage information 2230 in FIG. 22. Available storage information 2330 indicates that the storage environment in which the logical volume is to be configured includes the following: a striped disk array, Disk Array A, has ten columns (disks) across which data can be dispersed, one path to each disk, and a controller C3; Disk Array B includes fifteen disks, a controller C1, and one path to each disk; and Disk Array C includes three disks, one path to each disk, and a controller C4; and Disk Array D has one path to each of 15 disks and a controller C2.

None of the storage devices available provides multiple paths, so path reliability is implemented by using a different storage device for each set of mirrors. To meet user requirements 2210, Disk Array A alone is not suitable, unless configured using software, because Disk Array A does not provide either 15 columns or mirroring. Disk Array B has 15 disks available for striping and one controller, but is not striped. Disk Array C includes only three disks, not sufficient for providing the 30 disks that are needed. Disk Array D provides a second controller and another 15 disks. The combination of disk arrays B and D is selected to implement the logical volume, and logical volume configuration 2360 is produced. Mirrored stripes are addedusing software configuration.

After the examination of available storage information 2330, rules are selected to implement the capabilities specified and provided as capabilities implementation information 2340. In this example, path reliability is implemented using the PathReliabilityThroughMirroring template because no arrays with multiple paths are available. Note that capabilities implementation information 2340 includes rules for configuring mirrored stripes (mirrors within stripes), where each stripe has two mirrors and each mirror is on a separate controller. This configuration will require only two different controllers, because one set of mirrors will be placed under the control of one controller, and the other set of mirrors will be placed under control of the other controller. An alternative capabilities implementation information 2340 may reverse the order of the rules to produced striped mirrors (stripes within mirrors). Such an implementation would also require two controllers, one for each mirror copy of data.

When logical volume configuration 2360 is determined, the intent 2350 of the user is preserved, to be stored in physical storage device(s) 2380 along with the logical volume 2382 as part of "Data Stored with Logical Volume" 2384. Intent 2350 can include user requirements 2351 (taken from user requirements 2310) as well as rules and templates selected and variable values used 2352 to implement the logical volume 2384.

To implement the logical volume by configuring available hardware using software, a logical volume configuration, such as virtual object hierarchy 2360, is produced. Virtual object hierarchy 2360 includes a volume level, three columns (one for each stripe), and 30 mirrors.

Virtual object hierarchy 2360 is used to produce commands 2370 to configure logical volume 2382 in this format. These commands 2370 are executed to configure a logical volume from one or more physical storage devices. In this example, commands to create a subdisk for each mirror are first issued. Thirty mirrors are then created (two mirrors for each column) and associated with the subdisks. Fifteen columns are created, and, and two mirrors are associated with each column. This configuration enables each portion of data in a column to be accessible via two different paths, because the two mirrors for each column are associated with different controllers.

A plex is then created to combine the 15 columns containing portions of the data into one copy of the data. Note that each column includes two mirrors of the respective column's portion of the data, so that the data for each column is accessible via two paths. Each of the fifteen columns is associated with the plex, logical volume 2382 is created, and the plex is associated with the logical volume. Intent 2350, capability specification 2320, and capabilities implementation information 2340 are stored along with logical volume 2382 as "Data Stored with Logical Volume" 2384.

One of skill in the art that the particular formats of logical volume configurations 2260 of FIG. 22 and 2360 of FIG. 23 as virtual object hierarchies are only examples and are not intended to be limiting. Further information about logical volume configurations as virtual object hierarchies is provided below.

Logical Volume Configurations as Virtual Object Hierarchies

A logical volume configuration is expressed as a hierarchy of virtual objects, such as volumes, mirrors, and columns. A volume can be made up of co-volumes. One co-volume can be created for storing data, and a separate co-volume can be created for each type of log that is to be contained in the volume. The data co-volume can have a concatenated data layout, a striped data layout, a mirrored data layout, a mirrored-stripe data layout, or a striped-mirror data layout. Each of these types of data layouts is described in further detail below.

Figure 24:
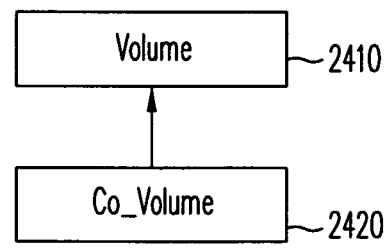
FIG. 24 is an example of a virtual object hierarchy for a logical volume.

A concatenated data layout has no compound rules in the rules; i.e., each rule is comprised of keyword clauses but no other rules. An example of a virtual object hierarchy for a concatenated data layout is shown in FIG. 24, with volume 2410 and data co-volume 2420. The PathReliabilityThroughMultipathing template provided as an example above produces a concatenated data layout hierarchy.

A striped data layout has only stripe rules in the rules:

```
rules {
    stripe <from> - <to> {
        ...
    }
    ...
}
```

Figure 25:
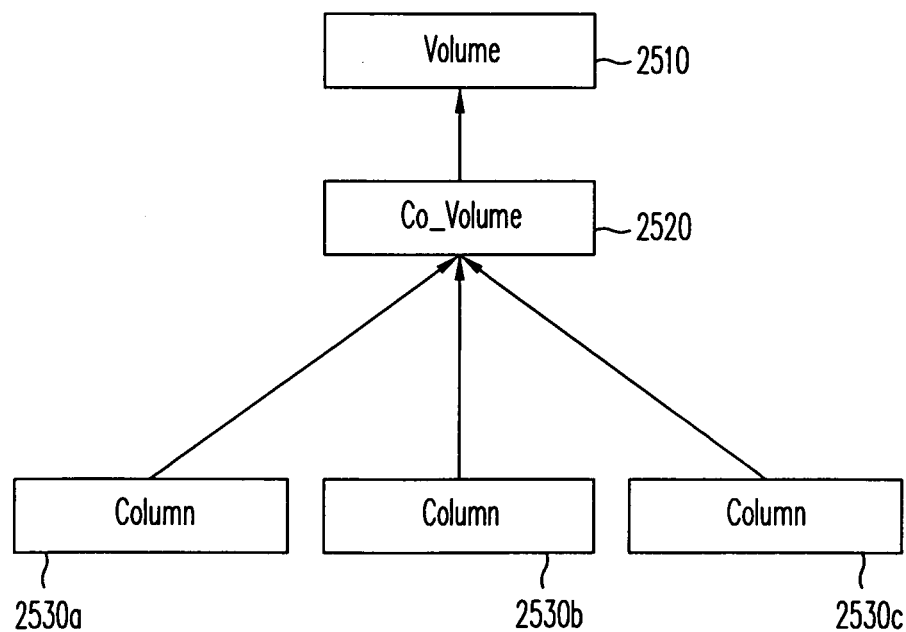
FIG. 25 is an example of a virtual object hierarchy for a striped logical volume.

An example of a virtual object hierarchy for a striped data layout is shown in FIG. 25, having volume 2510, data co-volume 2520, and columns 2530a, 2530b, and 2530c.

A mirrored data layout has only mirror-related rules. An example of rules specifying a mirrored data layout is given below:

```
rules {
    mirrorgroup A {
        mirror 2 {
            ...
        }
        mirror 1 {
            ...
        }
    }
    mirrorgroup B {
        mirror 1 {
            ...
        }
        mirror 2 {
            ...
        }
    }
    ...
}
```

Figure 26:
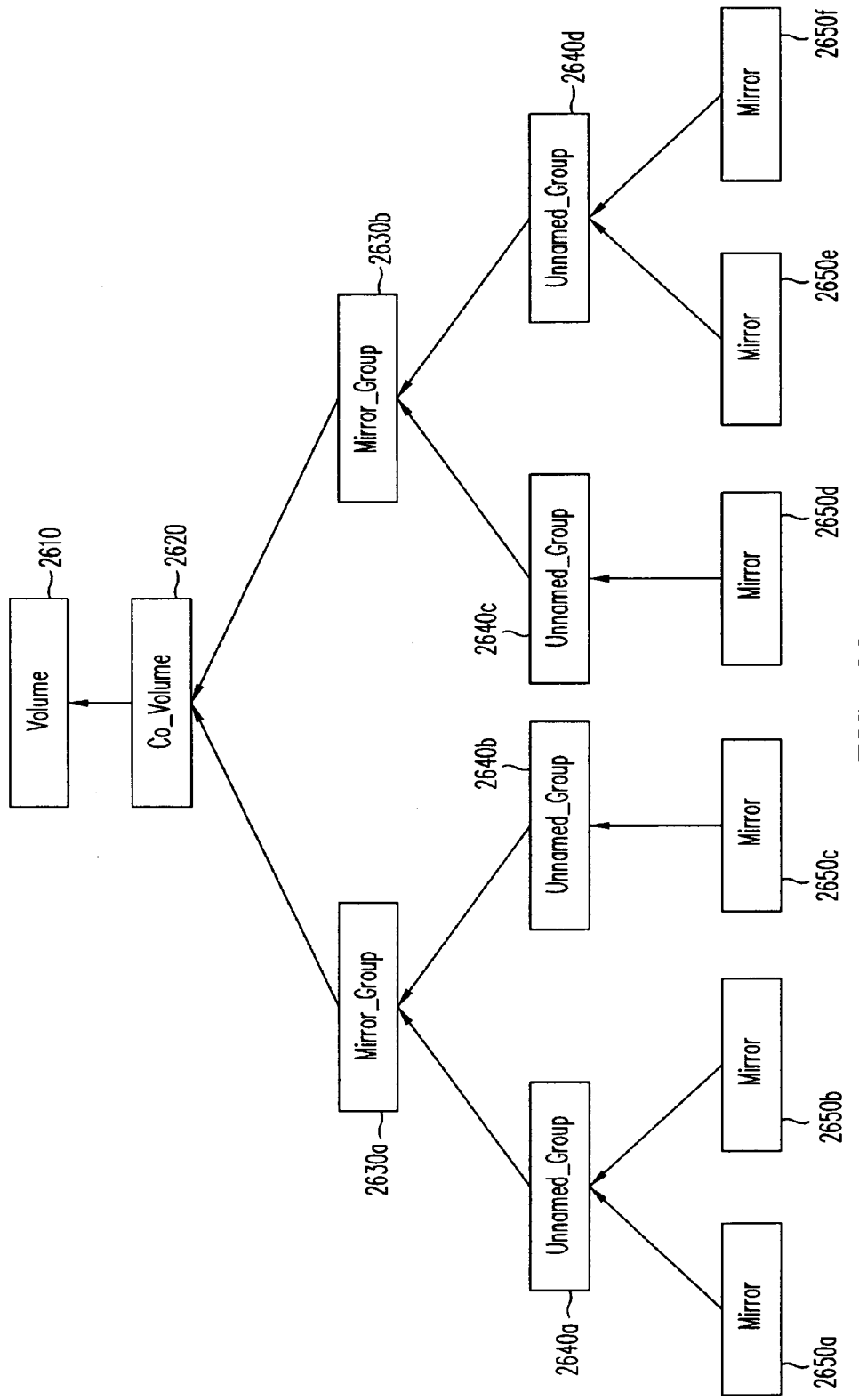
FIG. 26 is an example of a virtual object hierarchy for a mirrored logical volume.

An example of a mirrored data layout is shown in FIG. 26. Mirrored volume 2610 includes data co-volume 2620. A mirrored data layout such as mirrored volume 2610 can include mirror groups, such as mirror groups 2630a and 2630b, and multiple mirror rules within each mirror group. A mirror group node is created for each mirror group rule; in the example, mirror group 2630a corresponds to the mirrorgroup A rule above, and mirror group 2630b corresponds to mirrorgroup B above. An unnamed group node is created within a mirror group rule for each mirror rule. Unnamed group node 2640a corresponds to the mirror 2 rule within mirrorgroupA, and unnamed group node 2640b corresponds to the mirror 1 rule within mirrorgroupA. Similarly, unnamed group node 2640c corresponds to the mirror 1 rule within mirrorgroupB, and unnamed group node 2640d corresponds to the mirror 2 rule within mirrorgroupB.

Mirror nodes are created beneath the unnamed group nodes; in this example, unnamed group 2640a includes mirrors 2650a and 2650b created by the mirror 2 rule within mirrorgroupA; unnamed group 2640b includes mirror 2650c created by the mirror 1 rule within mirrorgroupA; unnamed group 2640c includes mirror 2650d created by the mirror 1 rule within mirrorgroupB; and unnamed group 2640d includes mirrors 2650e and 2650f created by the mirror 2 rule within mirrorgroupB. The number of mirror nodes created depends on the number of mirrors that are created by the mirror rule.

The DiskReliabilityThroughMirroring template provided as an example above produces a mirrored data layout hierarchy.

Figure 27:
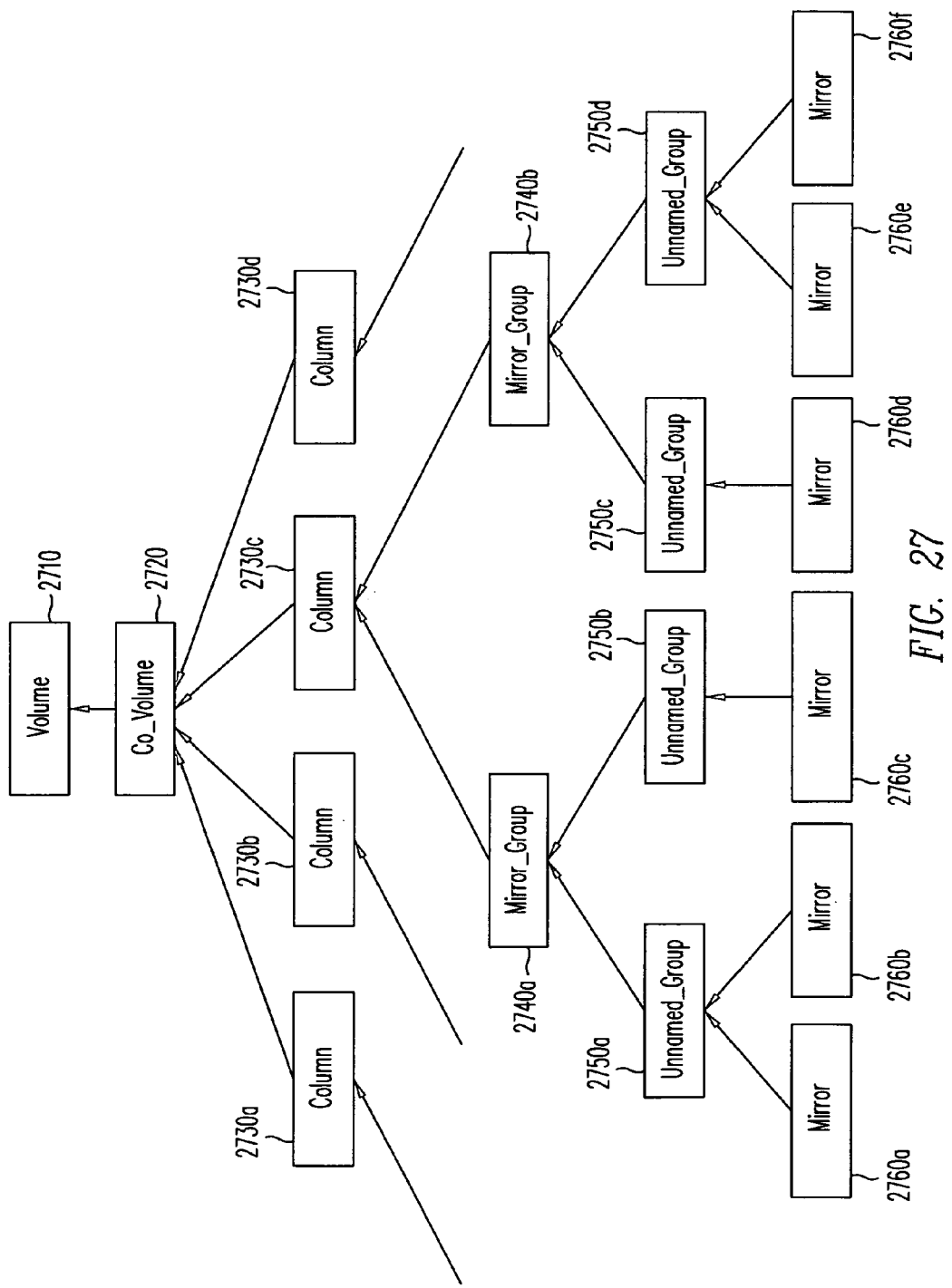
FIG. 27 is an example of a virtual object hierarchy for a mirrored-stripe logical volume.

In a mirrored-stripe layout, each column is mirrored; i.e., each column has multiple copies of data. Such a layout can be formed by having mirror-related rules within a stripe rule. The mirror group layer in a mirrored data layout is shown beneath the column nodes, as shown in FIG. 27. An example of a rule producing the mirrored-stripe layout of FIG. 27 is given below:

```
rules {
    stripe 4 {
        mirrorgroup A {
            mirror 2 {
                ...
            }
            mirror 1 {
                ...
            }
        }
        mirrorgroup B {
            mirror 1 {
                ...
            }
            mirror 2 {
                ...
            }
        }
        ...
    }
    ...
}
```

In FIG. 27, volume 2710 has data co-volume 2720, which is a striped volume including 4 columns 2730*a*, 2730*b*, 2730*c* and 2730*d*, as indicated by the stripe 4 rule above. Each stripe includes two mirror groups, corresponding to the mirrorgroup A and mirrorgroup B rules above. In the example, column 2730*c* has two mirror groups 2740*a* and 2740*b*. An unnamed group node is created within a mirror group rule for each mirror rule. Unnamed group node 2750*a* corresponds to the mirror 2 rule within mirrorgroupA, and unnamed group node 2750*b* corresponds to the mirror 1 rule within mirrorgroupA. Similarly, unnamed group node 2750*c* corresponds to the mirror 1 rule within mirrorgroupB, and unnamed group node 2750*d* corresponds to the mirror 2 rule within mirrorgroupB. Mirror nodes are created beneath the unnamed group nodes; in this example, unnamed group 2750*a* includes mirrors 2760*a* and 2760*b* created by the mirror 2 rule within mirrorgroupA; unnamed group 2750*b* includes mirror 2760*c* created by the mirror 1 rule within mirrorgroupA; unnamed group 2750*c* includes mirror 2760*d* created by the mirror 1 rule within mirrorgroupB; and unnamed group 2750*d* includes mirrors 2760*e* and 2760*f* created by the mirror 2 rule within mirrorgroupB. FIG. 23 provides another example of a logical volume configuration 2360 as a mirrored-stripe layout.

In a striped-mirror layout, each mirror includes striped data. Stripe rules within mirror rules result in a striped-mirror layout. The column layer of the hierarchy is created beneath the mirror layer.

```
rules {
    mirror 2 {
        stripe 4 {
            ...
        }
        ...
    }
    ...
}
```

Figure 28:
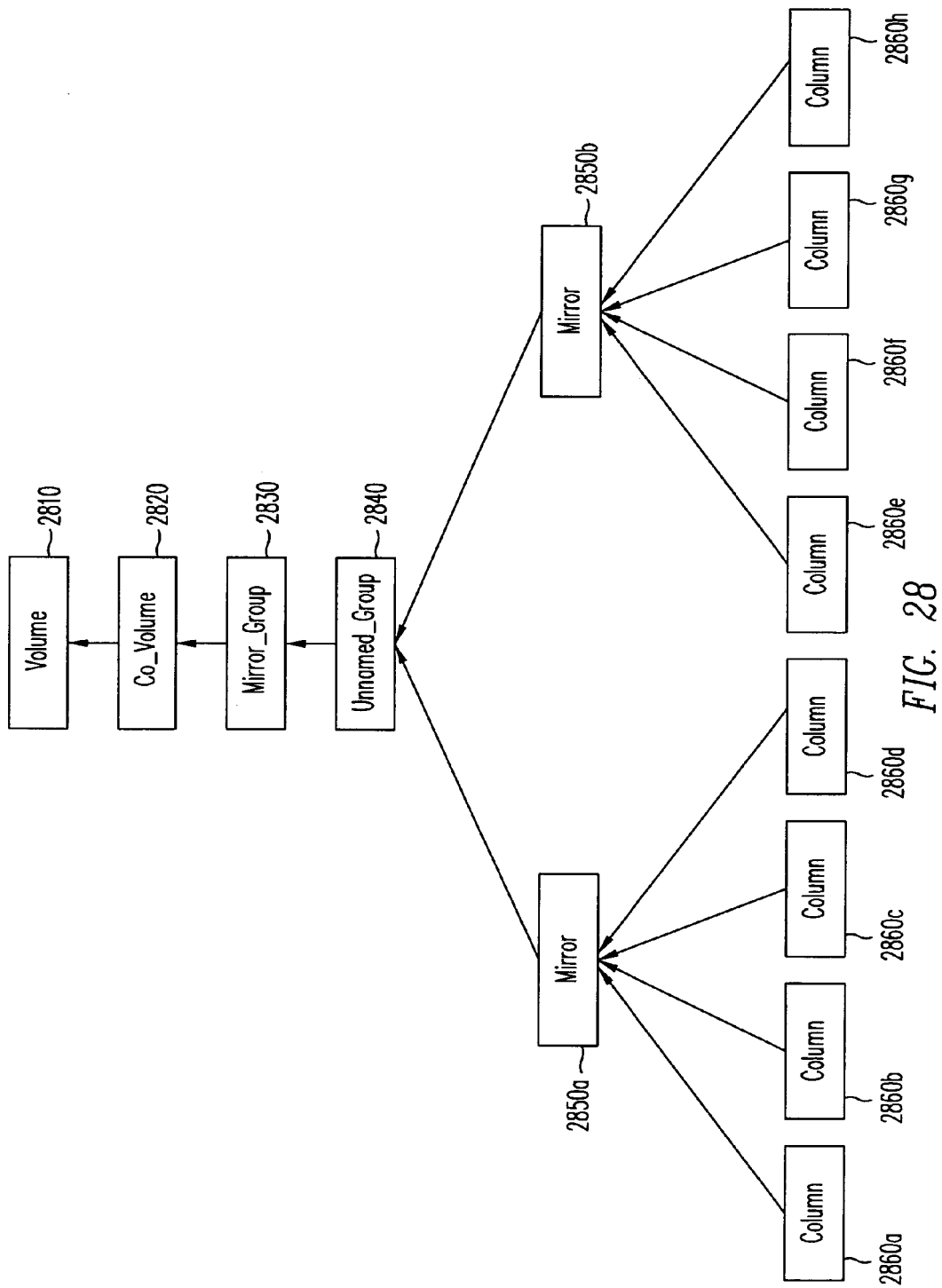
FIG. 28 is an example of a virtual object hierarchy for a striped-mirror logical volume.

An example of a striped-mirror layout is shown in FIG. 28. Volume 2810 includes data co-volume 2820. One mirror group 2830 includes one unnamed group 2840 and two mirrors 2850*a* and 2820*b*, which correspond to the mirror 2 rule above. Each mirror has four stripes: mirror 2850*a* has columns 2860*a*, 2860*b*, 2860*d*, and 2860*d*, and mirror 2850*b* has columns 2860*e*, 2860*f*, 2860*g*, and 2860*h*.

Logical volume configurations are further complicated by such volume characteristics as logs. A log rule can include a numerical range that indicates the number of logs to be created from the specified rules. Each log created is a mirror of the other logs. As noted above, logs are tracked in a separate co-volume from the data. The log co-volume can be either mirrored or striped.

A mirrored log layout may include only basic rules within the log rule. For each log co-volume, a single mirror group node is created. An unnamed group node is created within a mirror group rule for each log rule. Log nodes are created beneath the unnamed group nodes. The number of log nodes created is determined by the number of mirrors of logs created by the log rule. An example of rules specifying a mirrored log layout is given below:

```
rules {
    log 2 {
        ...
    }
    log 3 {
        ...
    }
}
```

Figure 29:
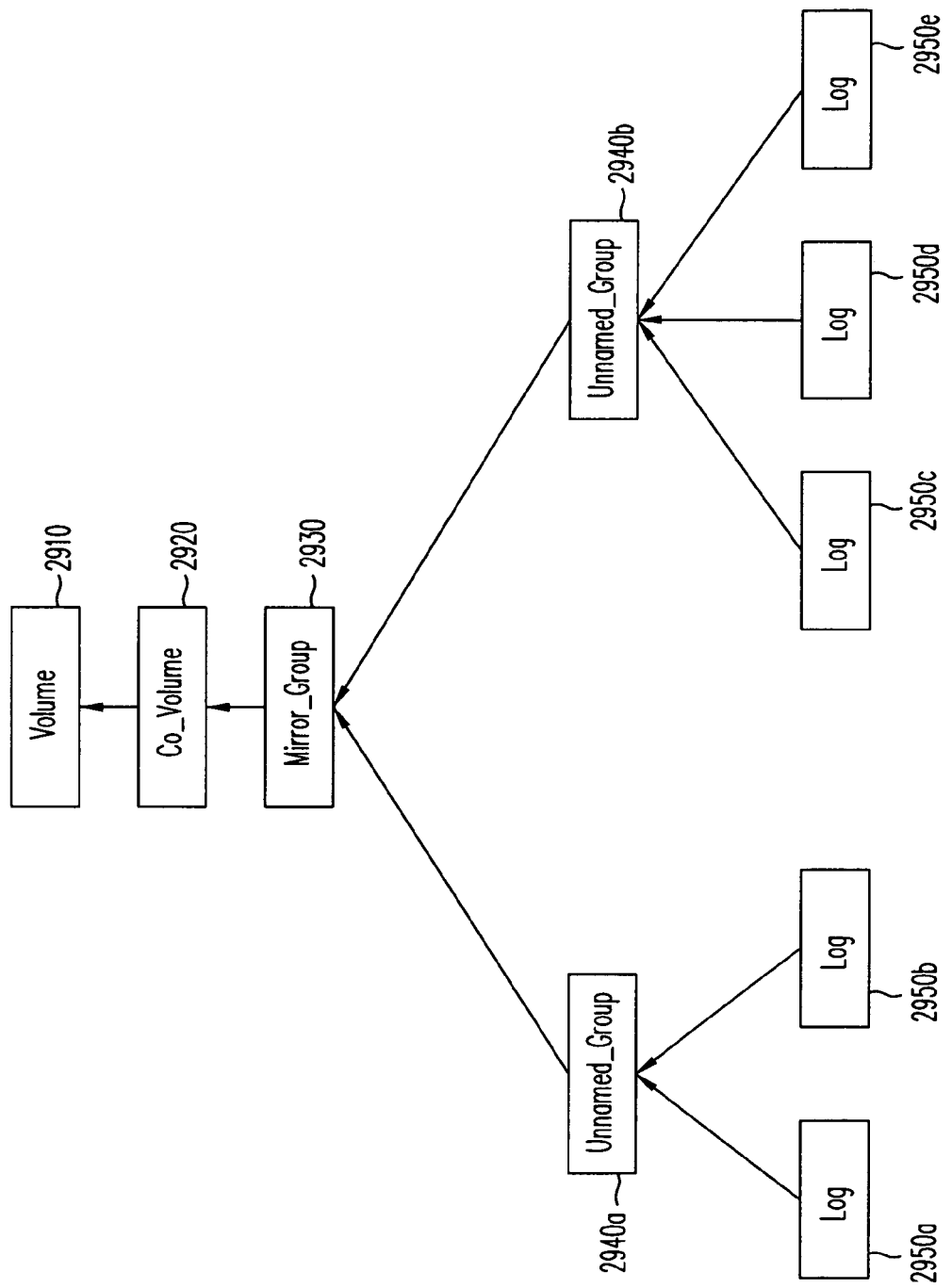
FIG. 29 is an example of a virtual object hierarchy for a mirrored log for a logical volume.

In this example, the first log rule creates two mirrors, and the second log rule creates three mirrors. An example of a mirrored log is shown in FIG. 29. Volume 2910 includes a log co-volume 2920 and a mirror group 2930 for the logs. Each log rule results in creation of an unnamed group. Unnamed group 2940*a* corresponds to the log 2 rule above, and unnamed group 2940*b* corresponds to the log 3 rule above. Unnamed group 2940*a* includes two logs 2950*a* and 2950*b*, created by the log 2 rule. Unnamed group 2940*b* includes three logs, 2950*c*, 2950*d*, and 2950*e*, created by the log 3 rule.

A log can be striped if stripe rules exist within the log rules. An example of rules specifying a striped log is given below:

```
rules {
    log 2 {
        stripe 4 {
            ...
        }
    }
}
```

-continued

```
    ...
    }
        ...
}
```

Figure 30:
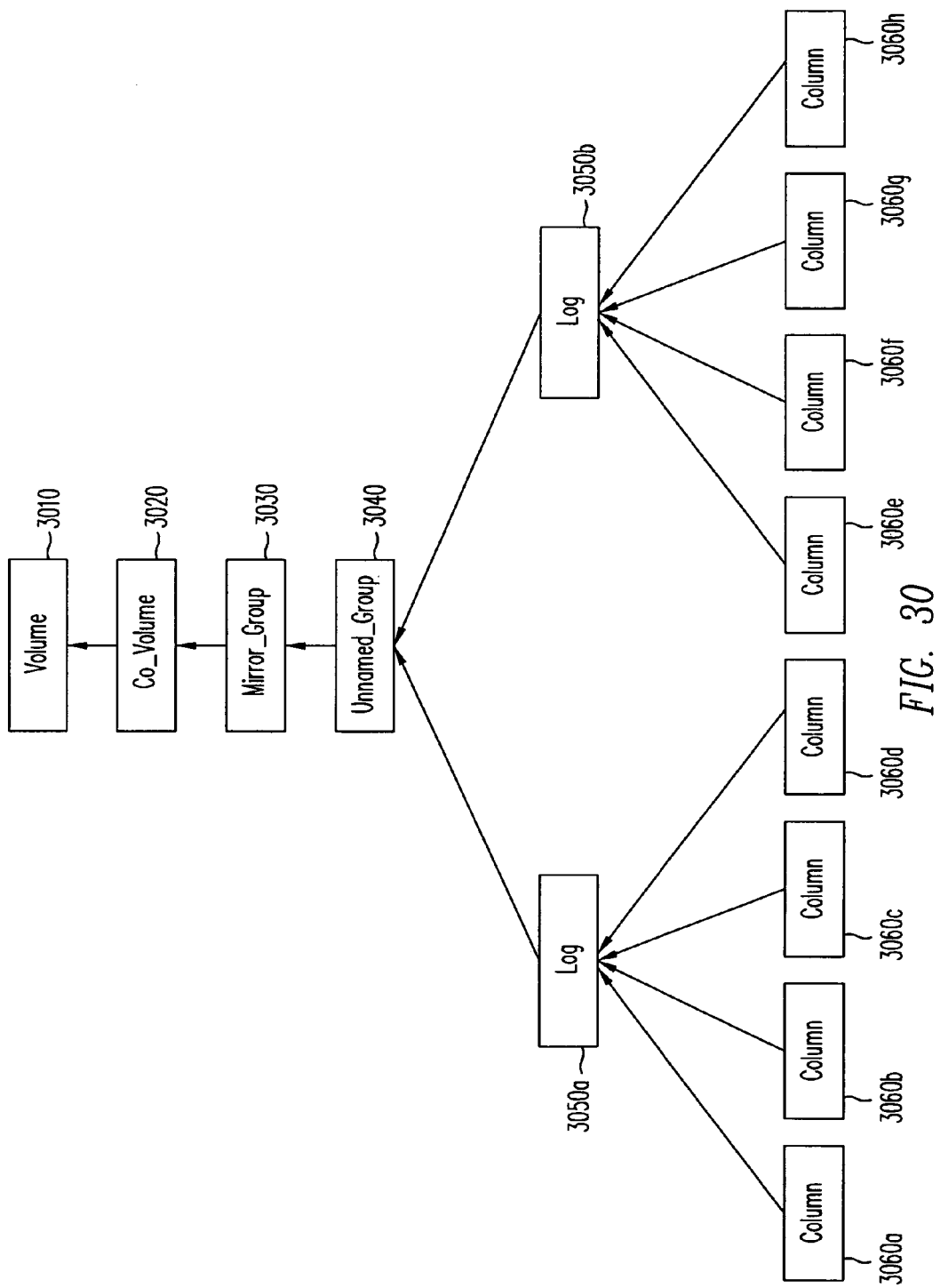
FIG. 30 is an example of a virtual object hierarchy for a striped log for a logical volume.

In this example, two logs are created, with each log having four columns. An example of a mirrored log is shown in FIG. 30. Volume 3010 includes a log co-volume 3020, a mirror group 3030, and an unnamed group 3040. Two logs 3050a and 3050b are created by the log 2 rule above. Each of the two logs includes four stripes, with log 3050a having columns 3060a through 3060d, and log 3050b having columns 3060e through 3060h.

It will be apparent to one skilled in the art that the virtual object hierarchies described above allow many logical volume configurations to be implemented to provide a variety of capabilities.

Advantages of the present invention are many. The present invention provides an extensible architecture that can easily be expanded to accommodate new types of storage technologies. Users can specify functional requirements or an intended use for a logical volume without being familiar with the various application programming interfaces and/or command line interfaces used to configure the physical hardware. The user's requirements and/or intended use are associated with capabilities to be provided by the logical volume. The intent of the user originally allocating the logical volume is stored along with the logical volume, and subsequent reconfigurations of the logical volume can use the stored intent to ensure that the reconfiguration preserves the original intent. Specific rules, templates, and/or variable values used to implement the logical volume are also stored with the logical volume.

Using the present invention, new features of devices provided by intelligent disk arrays and by storage area networks are supported and incorporated into storage configurations more easily. If available hardware is configured to meet the functional requirements of a logical volume, the hardware is used; if not, storage allocator software can be used to configure other available hardware to meet the user's functional requirements. The storage allocator can be used at a very low level, by administrators intimately familiar with the features of available storage devices, to provide a high level of control over how logical volumes are configured. In addition, the storage allocator provides great flexibility and can also be used by users without detailed technical knowledge.

The language provided includes rules corresponding to a set of one or more commands to configure a set of one or more storage devices to provide requested capabilities of a logical volume. The language supports direct inheritance of a capability, where a template specifies another template that contains rules to be used to provide a given capability. The language also supports indirect inheritance of a capability, where a template requires a capability but does not provide an implementation of the capability. In addition, the language is processed to "merge" rules by selecting a single storage device that conforms to more than one rule when possible. Merging rules enables a minimum number of storage devices to be used to meet a given logical volume configuration and set of capabilities.

The following section describes an example computer system and network environment in which the present invention may be implemented.

An Example Computing and Network Environment

Figure 31:
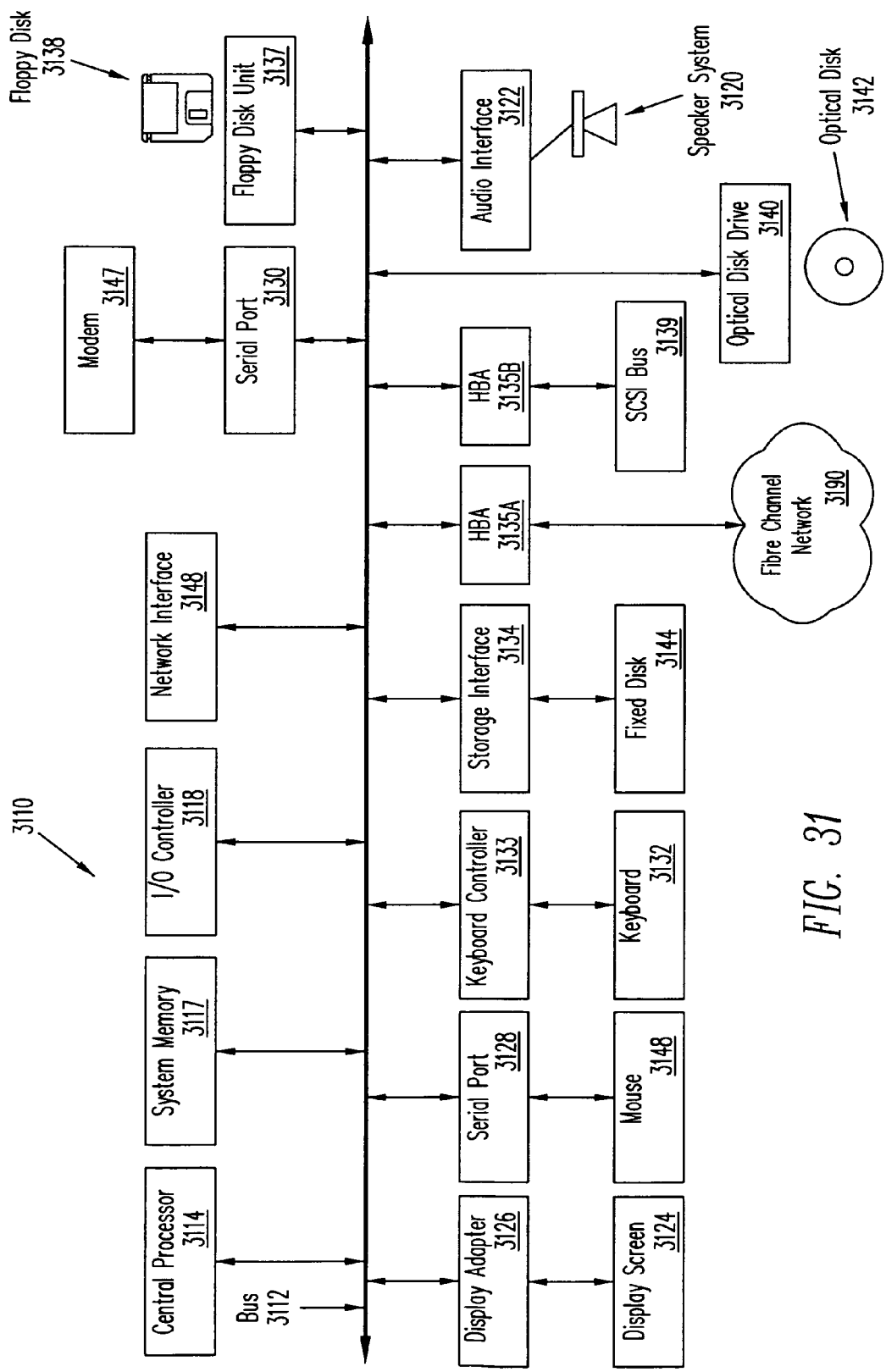
FIG. 31 is a block diagram illustrating a computer system suitable for implementing embodiments of the present invention.

FIG. 31 depicts a block diagram of a computer system 3110 suitable for implementing the present invention. Computer system 31710 includes a bus 3112 which interconnects major subsystems of computer system 3110, such as a central processor 3114, a system memory 3117 (typically RAM, but which may also include ROM, flash RAM, or the like), an input/output controller 3118, an external audio device, such as a speaker system 3120 via an audio output interface 3122, an external device, such as a display screen 3124 via display adapter 3126, serial ports 3128 and 3130, a keyboard 3132 (interfaced with a keyboard controller 3133), a storage interface 3134, a floppy disk drive 3137 operative to receive a floppy disk 3138, a host bus adapter (HBA) interface card 3135A operative to connect with a fibre channel network 3190, a host bus adapter (HBA) interface card 3135B operative to connect to a SCSI bus 3139, and an optical disk drive 3140 operative to receive an optical disk 3142. Also included are a mouse 3146 (or other point-and-click device, coupled to bus 3112 via serial port 3128), a modem 3147 (coupled to bus 3112 via serial port 3130), and a network interface 3148 (coupled directly to bus 3112).

Bus 3112 allows data communication between central processor 3114 and system memory 3117, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 3110 are generally stored on and accessed via a computer readable medium, such as a hard disk drive (e.g., fixed disk 3144), an optical drive (e.g., optical drive 3140), floppy disk unit 3137 or other storage medium. Additionally, applications may be in the form of electronic signals modulated in accordance with the application and data communication technology when accessed via network modem 3147 or interface 3148.

Storage interface 3134, as with the other storage interfaces of computer system 3110, may connect to a standard computer readable medium for storage and/or retrieval of information, such as a fixed disk drive 3144. Fixed disk drive 3144 may be a part of computer system 3110 or may be separate and accessed through other interface systems. Modem 3147 may provide a direct connection to a remote server via a telephone link or to the Internet via an internet service provider (ISP). Network interface 3148 may provide a direct connection to a remote server via a direct network link to the Internet via a POP (point of presence). Network interface 3148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 31 to be present to practice the present invention. The devices and subsystems may be interconnected in different ways from that shown in FIG. 31. The operation of a computer system such as that shown in FIG. 31 is readily known in the art and is not discussed in detail in this application. Code to implement the present invention may be stored in computer-readable storage media such as one or more of system memory 3117, fixed disk 3144, optical disk 3142, or floppy disk 3138. Additionally, computer system 3110 may be any kind of computing device, and so includes personal data assistants (PDAs), network appliance, X-window terminal or other such computing devices. The operating system provided on computer system 3110 may be MS-DOS®, MS-WINDOWS®, OS/2®, UNIX®, Linux®, or another known operating system. Computer system 3110 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 3110). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 32:
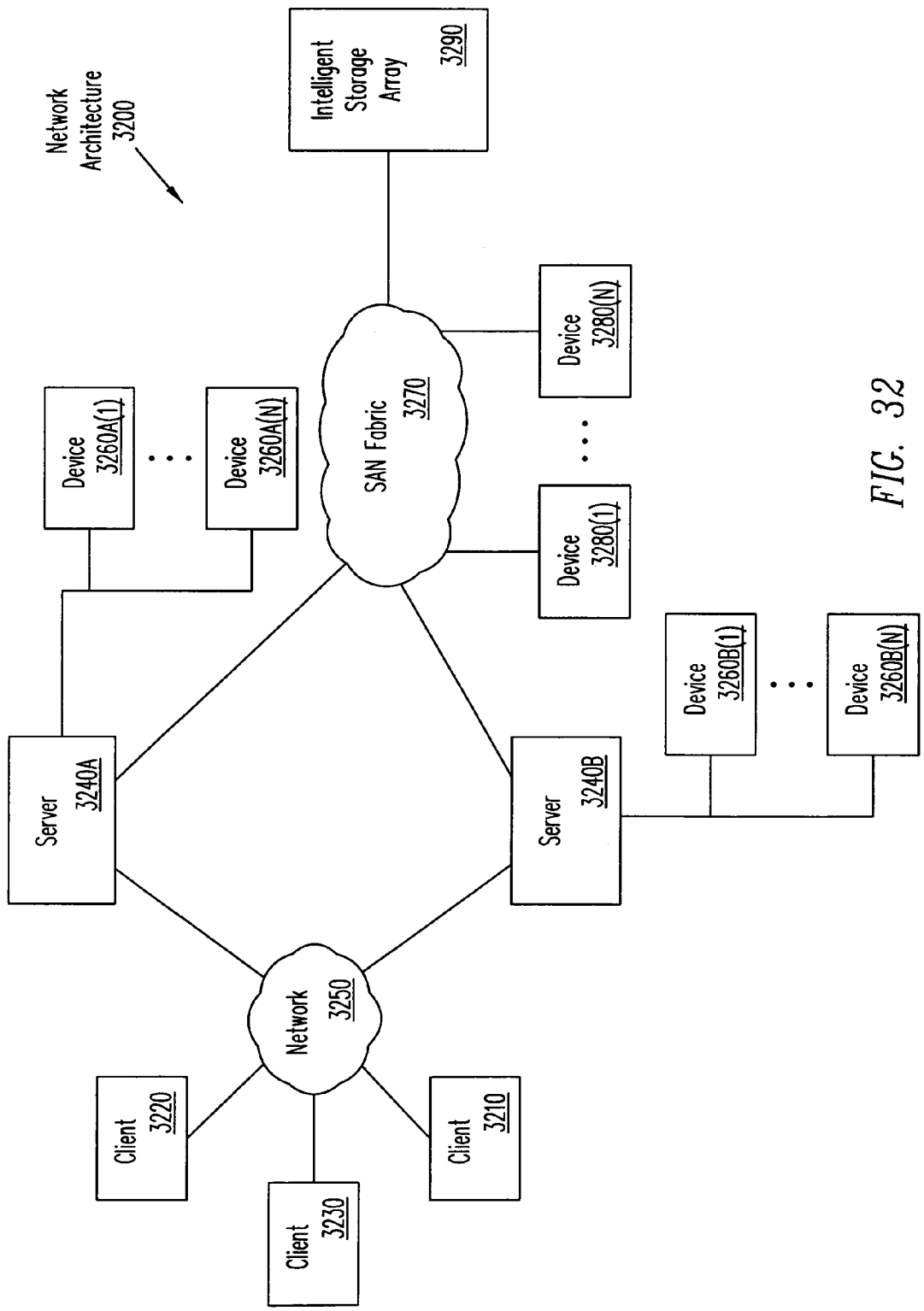
FIG. 32 is a block diagram illustrating a network environment in which storage management services according to embodiments of the present invention may be used.

FIG. 32 is a block diagram depicting a network architecture 3200 in which client systems 3210, 3220 and 3230, as well as storage servers 3240A and 3240B (any of which can be implemented using computer system 3110), are coupled to a network 3250. Storage server 3240A is further depicted as having storage devices 3260A(1)-(N) directly attached, and storage server 3240B is depicted with storage devices 3260B(1)-(N) directly attached. Storage servers 3240A and 3240B are also connected to a SAN fabric 3270, although connection to a storage area network is not required for operation of the invention. SAN fabric 3270 supports access to storage devices 3280(1)-(N) by storage servers 3240A and 3240B, and so by client systems 3210, 3220 and 3230 via network 3250. Intelligent storage array 3290 is also shown as an example of a specific storage device accessible via SAN fabric 3270.

With reference to computer system 3110, modem 3147, network interface 3148 or some other method can be used to provide connectivity from each of client computer systems 3210, 3220 and 3230 to network 3250. Client systems 3210, 3220 and 3230 are able to access information on storage server 3240A or 3240B using, for example, a web browser or other client software (not shown). Such a client allows client systems 3210, 3220 and 3230 to access data hosted by storage server 3240A or 3240B or one of storage devices 3260A(1)-(N), 3260B(1)-(N), 3280(1)-(N) or intelligent storage array 3290. FIG. 32 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    automatically producing a logical volume configuration to implement a logical volume including a requested characteristic, wherein
        the producing the logical volume configuration uses information about available storage devices, and
        an implementation of the requested characteristic is not provided by a user as input to produce the logical volume configuration;
    and
    executing at least one command to configure a set of the available storage devices to provide the logical volume in accordance with the logical volume configuration.

2. The method of claim 1 wherein
    the producing the logical volume configuration includes identifying a device of the available storage devices to include in the set, wherein the device provides the requested characteristic; and
    the executing the at least one command identifies the device to be used to implement the logical volume.

3. The method of claim 1 wherein
    the executing the at least one command includes implementing the requested
        characteristic as a capability in software for a device of the set of the available storage devices.

4. The method of claim 1 wherein
    the producing the logical volume configuration includes:
        including a first device of the available storage devices in the set, wherein
            the first device provides a first amount of storage with the requested characteristic;
        including a second device of the available storage devices in the set, wherein
            the second device provides a second amount of storage with the requested characteristic; and
        the executing the at least one command includes configuring the first device and the second device to provide a sum of the first and second amounts of storage with the requested characteristic.

5. The method of claim 1 further comprising:
    requesting the requested characteristic by selecting from a plurality of capabilities.

6. The method of claim 1 further comprising:
    requesting the requested characteristic in the form of a capability.

7. The method of claim 1 further comprising:
    obtaining the requested characteristic from a user.

8. The method of claim 1 further comprising:
    obtaining the available storage information from a storage area network.

9. The method of claim 1 further comprising:
    requesting the requested characteristic by specifying a rule that configures the logical volume to provide a capability satisfying the requested characteristic.

10. The method of claim 1 further comprising:
    requesting the requested characteristic by specifying an application-specific template that configures the logical volume to provide a capability satisfying the requested characteristic.

11. The method of claim 1 further comprising:
    requiring a capability of the logical volume to meet a policy related to the requested characteristic.

12. A system comprising:
    producing means for automatically producing a logical volume configuration to implement a logical volume including a requested characteristic, wherein
        the producing the logical volume configuration uses information about available storage devices, and
        an implementation of the requested characteristic is not provided by a user as input to produce the logical volume configuration;
    and
    executing means for executing at least one command to configure a set of the available storage devices to provide the logical volume in accordance with the logical volume configuration.

13. The system of claim 12 further comprising:
    capability-obtaining means for obtaining the requested characteristic from a user and determining an associated capability.

14. The system of claim 12 further comprising:
    storage information-obtaining means for obtaining the available storage information from a storage area network.

15. A system comprising:
    producing instructions to automatically produce a logical volume configuration to implement a logical volume including a requested characteristic, wherein
        the producing instructions use information about available storage devices to produce the logical volume configuration, and
        an implementation of the requested characteristic is not provided by a user as input to produce the logical volume configuration;
    and
    executing instructions to execute at least one command to configure a set of the available storage devices to provide the logical volume in accordance with the logical volume configuration.

16. The system of claim 15 further comprising:
    capability-obtaining instructions to obtain the requested characteristic from a user and to determine an associated capability.

17. The system of claim 15 further comprising:
storage information-obtaining instructions to obtain the available storage information from a storage area network.

18. The system of claim 15 further comprising:
requesting instructions to provide an interface from which to select the requested characteristic from a plurality of capabilities.

19. The system of claim 15 wherein
requesting instructions to provide an interface to request the requested characteristic in the form of a capability.

20. The system of claim 15 further comprising:
requesting instructions to provide an interface to specify a rule that configures the logical volume to provide a capability satisfying the requested characteristic.

21. A computer program product comprising:
producing instructions to automatically produce a logical volume configuration to implement a logical volume including a requested characteristic, wherein
the producing instructions use information about available storage devices to produce the logical volume configuration, and
an implementation of the requested characteristic is not provided by a user as input to produce the logical volume configuration;
executing instructions to execute at least one command to configure a set of the available storage devices to provide the logical volume in accordance with the logical volume configuration; and
a computer-readable medium to store the producing instructions and the executing instructions.

22. The computer program product of claim 21 further comprising:
capability-obtaining instructions to obtain the requested characteristic from a user and determine a capability satisfying the requested characteristic, wherein
the computer-readable medium further stores the capability-obtaining instructions.

23. The computer program product of claim 21 further comprising:
storage information-obtaining instructions to obtain the available storage information from a storage area network, wherein
the computer-readable medium further stores the storage information-obtaining instructions.

24. The computer program product of claim 21 further comprising:
requesting instructions to provide an interface from which to select the requested characteristic from a plurality of capabilities, wherein
the computer-readable medium further stores the requesting instructions.

25. The computer program product of claim 21 further comprising:
requesting instructions to provide an interface to request the requested characteristic in the form of a capability, wherein
the computer-readable medium further stores the requesting instructions.

26. The computer program product of claim 21 further comprising:
requesting instructions to provide an interface to specify a rule that configures the logical volume to provide a capability satisfying the requested characteristic, wherein
the computer-readable medium further stores the requesting instructions.

27. The method of claim 1 wherein the logical volume configuration further comprises a hierarchy of virtual objects.

28. The method of claim 27 wherein the virtual objects include one or more of a volume, a mirror, a column, a volume group, a mirror group, a co-volume, an unnamed group, or a group of groups.

* * * * *